US009645605B2

(12) United States Patent
Park et al.

(10) Patent No.: US 9,645,605 B2
(45) Date of Patent: May 9, 2017

(54) DISPLAY APPARATUS HAVING DEFORMABLE DISPLAY MODULE AND METHOD OF CONTROLLING THE SAME

(71) Applicant: SAMSUNG ELECTRONICS CO., LTD., Suwon-si (KR)

(72) Inventors: Jae Hoo Park, Suwon-si (KR); Gyu Sung Do, Seoul (KR); Dong Yup Lee, Anseong-si (KR); Woo Sung In, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 136 days.

(21) Appl. No.: 14/554,900

(22) Filed: Nov. 26, 2014

(65) Prior Publication Data
US 2015/0145837 A1    May 28, 2015

(30) Foreign Application Priority Data

Nov. 28, 2013  (KR) .................. 10-2013-0146669
Jan. 6, 2014   (KR) .................. 10-2014-0001556
Jan. 29, 2014  (KR) .................. 10-2014-0011762

(51) Int. Cl.
*G06F 1/16*     (2006.01)
*H04N 5/44*     (2011.01)
*H04N 21/422*   (2011.01)
*H04N 21/485*   (2011.01)
*H04N 5/64*     (2006.01)

(52) U.S. Cl.
CPC ............ *G06F 1/16* (2013.01); *H04N 5/4403* (2013.01); *H04N 5/64* (2013.01); *H04N 21/42215* (2013.01); *H04N 21/42219* (2013.01); *H04N 21/485* (2013.01); *G09G 2380/02* (2013.01); *H04N 2005/4408* (2013.01); *H04N 2005/4423* (2013.01)

(58) Field of Classification Search
CPC .......... G06F 1/16; H04N 5/4403; H04N 5/64; H04N 21/42215; H04N 21/42219; H04N 21/485; H04N 2005/4408; H04N 2005/4423; G09G 2380/02
USPC ....................................... 345/184
See application file for complete search history.

(56) References Cited

U.S. PATENT DOCUMENTS 6,633,286 B1 * 10/2003 Do ............ B64D 11/0015
                                           345/204
9,058,758 B2 *  6/2015 Shin ............ G09G 3/3688
(Continued)

FOREIGN PATENT DOCUMENTS

JP    2009109812 A      5/2009
KR    2020080006708    12/2008
KR    1020090035877     4/2009

OTHER PUBLICATIONS

Communication issued on Feb. 6, 2015 by the International Searching Authority in related Application No. PCT/KR2014/011438.

*Primary Examiner* — Stephen Sherman
(74) *Attorney, Agent, or Firm* — Sughrue Mion, PLLC

(57) ABSTRACT

Display apparatuses and methods are provided. A display apparatus includes a display module, a driving device that is configured to deform the display module from a flat surface state to a curved surface state and deform the display module from the flat surface state to the curved surface state, and a base member that is disposed at a rear of the display module and supports the driving device.

28 Claims, 48 Drawing Sheets

(56) References Cited

U.S. PATENT DOCUMENTS

| | | | |
|---|---|---|---|
| 2006/0232552 A1* | 10/2006 | Chung | F16M 11/08 |
| | | | 345/156 |
| 2012/0224347 A1* | 9/2012 | Hayakawa | F16M 11/08 |
| | | | 361/807 |
| 2013/0114193 A1 | 5/2013 | Joo et al. | |
| 2013/0155655 A1 | 6/2013 | Lee et al. | |
| 2013/0207946 A1* | 8/2013 | Kim | G09G 3/3225 |
| | | | 345/204 |
| 2013/0215088 A1* | 8/2013 | Son | G09G 5/40 |
| | | | 345/204 |
| 2014/0198465 A1* | 7/2014 | Park | H05K 5/0226 |
| | | | 361/749 |
| 2014/0226266 A1* | 8/2014 | Kang | H01L 51/0097 |
| | | | 361/679.01 |
| 2014/0354791 A1* | 12/2014 | Lee | G06K 9/00228 |
| | | | 348/77 |
| 2015/0009635 A1* | 1/2015 | Kang | G09F 9/301 |
| | | | 361/749 |

* cited by examiner

DISPLAY APPARATUS HAVING DEFORMABLE DISPLAY MODULE AND METHOD OF CONTROLLING THE SAME

CROSS-REFERENCE TO RELATED APPLICATION(S)

This application claims priority from Korean Patent Application Nos. 10-2013-0146669 filed on Nov. 28, 2013, Korean Patent Application No. 10-2014-0001556 filed on Jan. 6, 2014, and Korean Patent Application No. 10-2014-0011762, filed on Jan. 29, 2014, the entire disclosures of which are incorporated herein by reference.

BACKGROUND

1. Field

Apparatuses and methods consistent with exemplary embodiments relate to a display module that is deformable, a display apparatus including a driving device for deforming the display module and a method of controlling the same.

2. Description of Related Art

In general, a display apparatus includes a display module on which an image and images are displayed. Examples of such a display apparatus include televisions (TVs) and monitors. A typical display apparatus includes a flat panel shape which can make it difficult for viewers who are not positioned directly in front of the display panel to see high quality image.

Recently, display apparatuses have been including a deformed or otherwise curved display panel so that the display panel can be viewed in a curved state. As an example of a deformed display apparatus, Japanese Patent Laid-open Publication No. 1998-026754 discloses a display apparatus in which female screws are disposed at both sides of a display panel, and one male screw to which two nuts are fastened is disposed and rotated so that the display panel can be deformed in an arc shape. This arc-shaped display panel allows for viewers who are not positioned directly in front of the display to view a better quality image.

SUMMARY

Apparatuses and methods consistent with exemplary embodiments relate to displaying, and more specifically, to a display apparatus and a method for providing a summary broadcasting service of content, for example, sports-related broadcasting content.

One or more exemplary embodiments provide a display apparatus in which a display module may be selectively changed into a flat surface state or a curved surface state.

According to an aspect of an exemplary embodiment, there is provided a display apparatus including a display module, a driving device that is configured to deform the display module from a flat surface state to a curved surface state and deform the display module from the flat surface state to the curved surface state; and a base member that is disposed at a rear of the display module and supports the driving device.

The display apparatus may further include a case that covers a rear side of the base member.

The case may be deformed to correspond to a deformation of the display module.

The driving device may include a driving unit that is installed at the base member and is configured to generate a driving force.

The driving device may include a plurality of movement members that are configured to move in opposite directions based on a driving force generated by the driving unit, and a plurality of rotation members that are configured to rotate by the plurality of movement members to cause respective sides of the display module to be moved in a forward and a backward direction.

The plurality of movement members may include at least one first movement member that is configured to move straightly in a first direction, and at least one second movement member that is configured to move straightly in a second direction opposite to the first direction, and the plurality of rotation members may include at least one first rotation member having a first end that is rotatably installed at the at least one first movement member and a second end that is rotatably installed at a first side end of the display module, and at least one second rotation member having a first end that is rotatably installed at the at least one second movement member and a second end that is rotatably installed at a second side end of the display module placed at an opposite side to the first side end.

The base member may include a plurality of movement guides that support the at least one first movement member and the at least one second movement member to be movable.

The driving unit may include a driving motor that is configured to generate a rotational force, a pinion that is configured to rotate by the rotational force transmitted from the driving motor, and a first rack and a second rack that horizontally move in opposite directions according to rotation of the pinion, the at least one first movement member may be configured to move in the first direction toward the first side end of the display module using the first rack, and the at least one second movement member may be configured to move in the second direction using the second rack.

The at least one first movement member may include a pair of first movement members that are disposed to be spaced apart from each other in a vertical direction, and the at least one second movement member may include a pair of second movement members that are disposed to be spaced apart from each other in the vertical direction.

The driving device may further include a first connection member configured to extend in a vertical direction, connect the pair of first movement members and be connected to the first rack, and a second connection member configured to extend in a vertical direction, connect the pair of second movement members and be connected to the second rack.

The at least one first rotation member may include a pair of first rotation members having a first end that is rotatably installed at the pair of first movement members and a second end that is rotatably installed at the first side end of the display module.

The at least one second rotation member may include a pair of second rotation members having a first end that is rotatably installed at the pair of second movement members and a second end that is rotatably installed at the second side end of the display module.

The display apparatus may further include at least one printed circuit board (PCB) disposed between the display module and the base member.

The at least one PCB may include at least one of a power substrate that is configured to connect to an external power supply and supply power to the display apparatus, a signal processing substrate configured to process various image and sound signals, a panel driving substrate that is configured to control driving of a display module included in the display module, and a timing control substrate that is configured to transmit the image signals to the display panel.

The display apparatus may further include a stand fixed to the base member.

According to an aspect of another exemplary embodiment, there is provided a display apparatus including a display module, a driving device that is configured deform the display module from a flat surface state to a curved surface state and deform the display module from the flat surface state to the curved surface state, and a controller that is configured to control the driving device, wherein the controller is configured to operate the driving device according to a user input.

The user input may be received through a button disposed on one of a remote controller and the display apparatus.

The driving device may be configured to deform a curvature of the display module in a continuous manner in proportion to a pressing time of the button on one of the remote controller and the display apparatus.

The driving device may be configured to deform a curvature of the display module in a multi-stage manner according to a number of times the button on one of the remote controller and the display apparatus is pressed.

According to an aspect of another exemplary embodiment, there is provided a display apparatus including a display module, a driving device that is configured to deform the display module from a flat surface state to a curved surface state and deform the display module from the flat surface state to the curved surface state, and a controller that is configured to control the driving device, wherein the controller is configured to operate the driving device based on a type of content of an image to be displayed on the display module.

The controller may be configured to operate the driving device based on input information regarding the type of content.

The input information regarding the type of content may be input using a button disposed on one of a remote controller and the display apparatus.

The input information regarding the type of content may be received from an image transmitter that transmits the image, together with image information.

According to an aspect of another exemplary embodiment, there is provided a method of controlling a display apparatus, the method including determining whether a user input for changing a curvature of a display module is received by the display apparatus, in response to determining that the user input is received, starting deformation of the display module, determining whether the user input stops being received by the display apparatus, in response to determining that the user input stops being received, stopping deformation of the display module, and in response to determining that the user input does not stop being received, continuously deforming the display module.

According to an aspect of another exemplary embodiment, there is provided a method of controlling a display apparatus, the method including determining whether a user input for changing a curvature of a display module is received by the display apparatus, in response to determining that the user input is received, displaying a user interface for selecting a mode on a screen, and controlling a display module in a mode selected through the user interface.

The user interface may provide for selection of an automatic mode in which a curvature of the display module is automatically changed according to a type of content to be displayed on the display module, and a manual mode in which the curvature of the display module is changed to correspond to a user input using an input device.

The method may further include, in response to the automatic mode being selected through the user interface, determining the type of content, and deforming the display module to have a curvature set according to the determined type of content.

The method may further include, in response to the manual mode being selected through the user interface, displaying a selectable curvature is on the user interface, and determining whether the curvature is selected through the user interface, and the display module is deformed to have the selected curvature.

According to an aspect of another exemplary embodiment, there is provided an apparatus for adjusting the curvature of a display panel, the apparatus including an interface configured to receive an input from a user or to detect contents being played or selected to be played on a display of the display panel, and a controller configured to adjust a curvature of the display panel, in response to the interface receiving the input or detecting the contents.

In response to the interface receiving the input from the user, the controller may adjust the curvature of the display panel in response to the received input from the user.

In response to the interface detecting the contents being played or selected to be played on the display, the controller may adjust the curvature of the display panel.

The controller may be configured to adjust the curvature of the frame equally by adjusting opposing end portions of the display panel by an amount between a minimum and maximum adjustment range of the curvature.

The controller may be further configured to change a sound setting of the display apparatus to correspond to the adjusting of the curvature of the display panel.

BRIEF DESCRIPTION OF THE DRAWINGS

These and/or other aspects will become apparent and more readily appreciated from the following description of the exemplary embodiments, taken in conjunction with the accompanying drawings of which.

DETAILED DESCRIPTION

Figure 1:
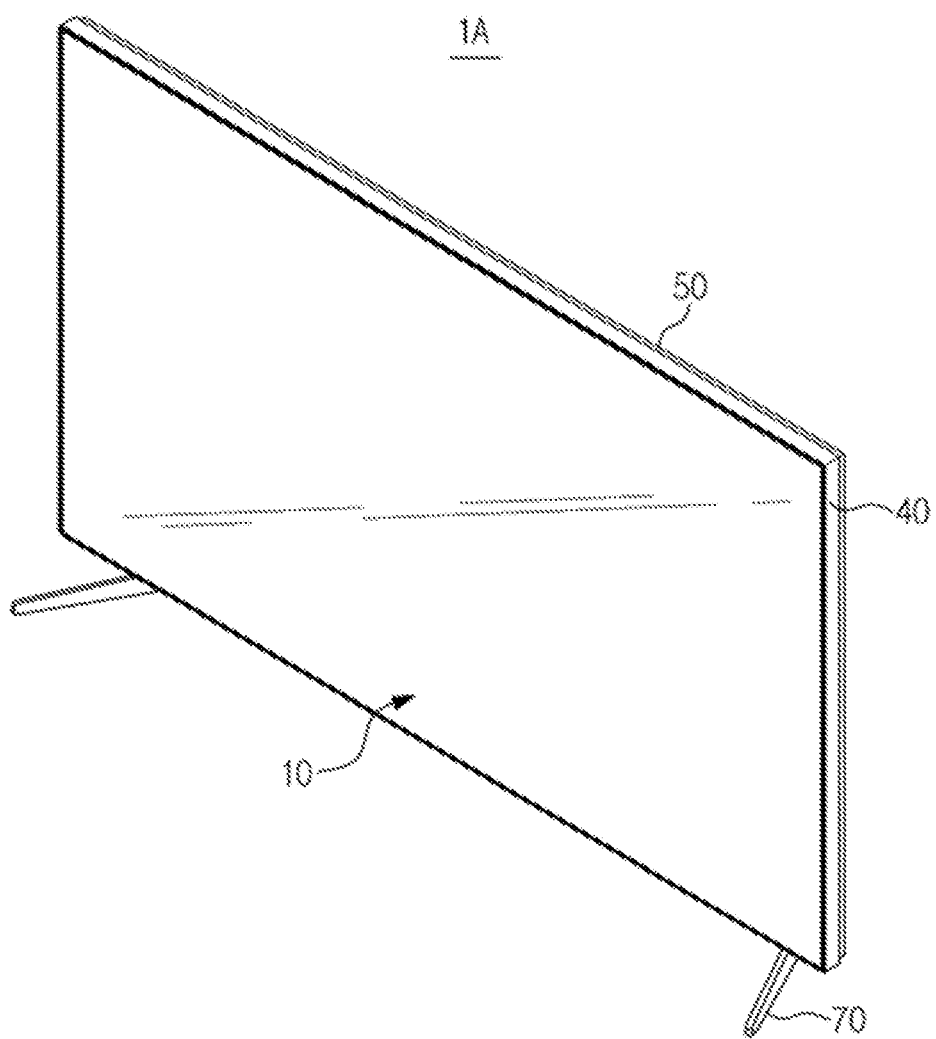
FIG. 1 is a perspective view of a display module of a display apparatus in a flat surface state according to an exemplary embodiment.

Reference will now be made to the exemplary embodiments, examples of which are illustrated in the accompanying drawings, wherein like reference numerals refer to like elements throughout.

Hereinafter, a display apparatus according to exemplary embodiments are described with reference to the drawings.

Figure 2:
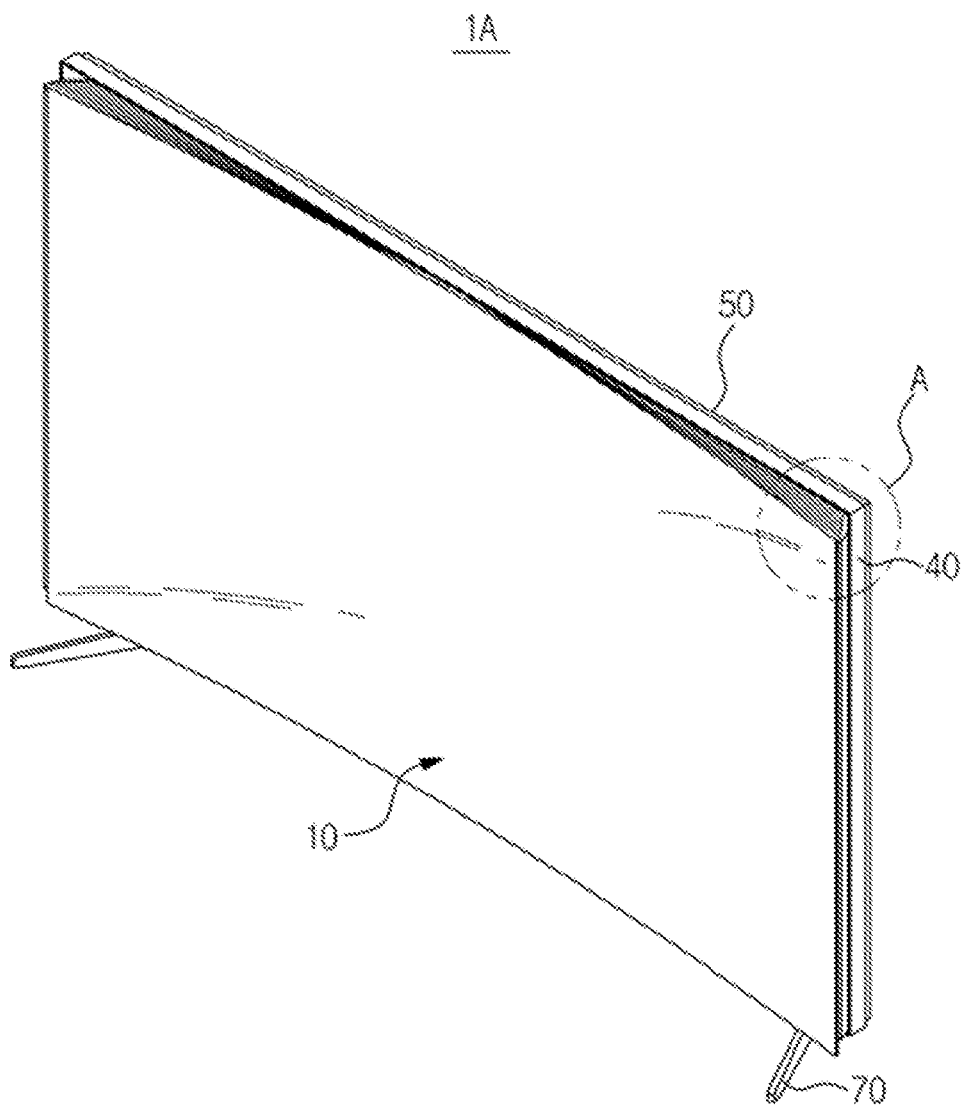
FIG. 2 is a perspective view of the display module of a display apparatus in a curved surface state according to an exemplary embodiment.
Figure 3:
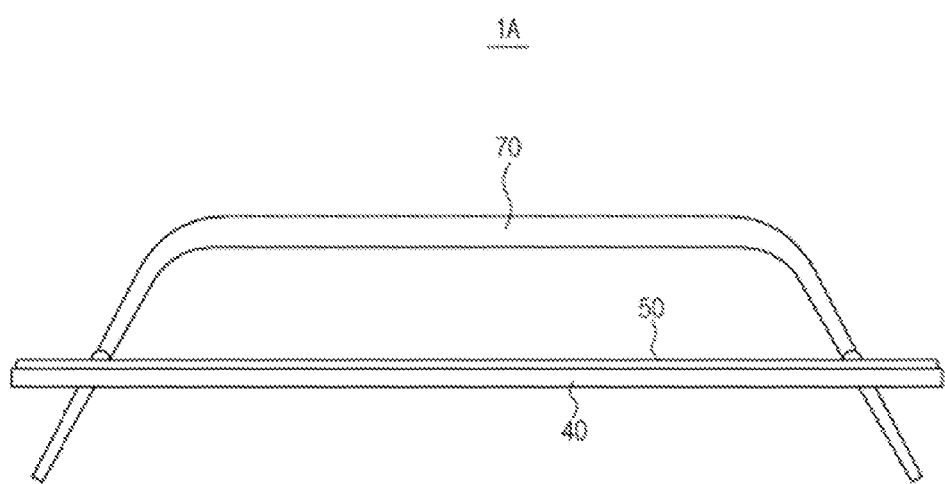
FIG. 3 is a plan view of the display module of the display apparatus in the flat surface state according to an exemplary embodiment.
Figure 4:
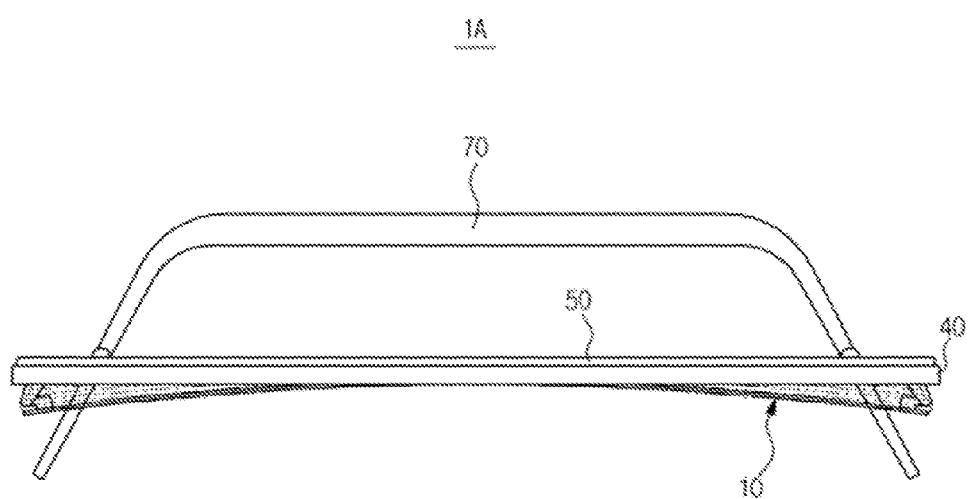
FIG. 4 is a plan view of the display module of the display apparatus in the curved surface state according to an exemplary embodiment.

As illustrated in FIGS. 1-4, a display apparatus 1A according to a first embodiment includes a display module 10 that has a frame which has the potential to be deformed and of which both ends of the frame may protrude forward rather than as a flat surface. The display module 10 may be in a flat surface state, as illustrated in FIGS. 1 and 3, and a curved surface state in which both ends of the display module 10 protrude forward having a predetermined curvature, as illustrated in FIGS. 2 and 4. In these examples, FIGS. 3 and 4 are plan views from above of FIGS. 1 and 2, respectively.

Examples of the display apparatuses described herein include televisions, such as high-definition televisions (HDTVs), Ultra HD-TVs (UHD-TVs), computer monitors, and the like. One example is an HD-TV that may be viewed by users in their home. The display apparatuses may be set inside of frames made of various materials, such as plastic, metal, glass, and the like.

Figure 5:
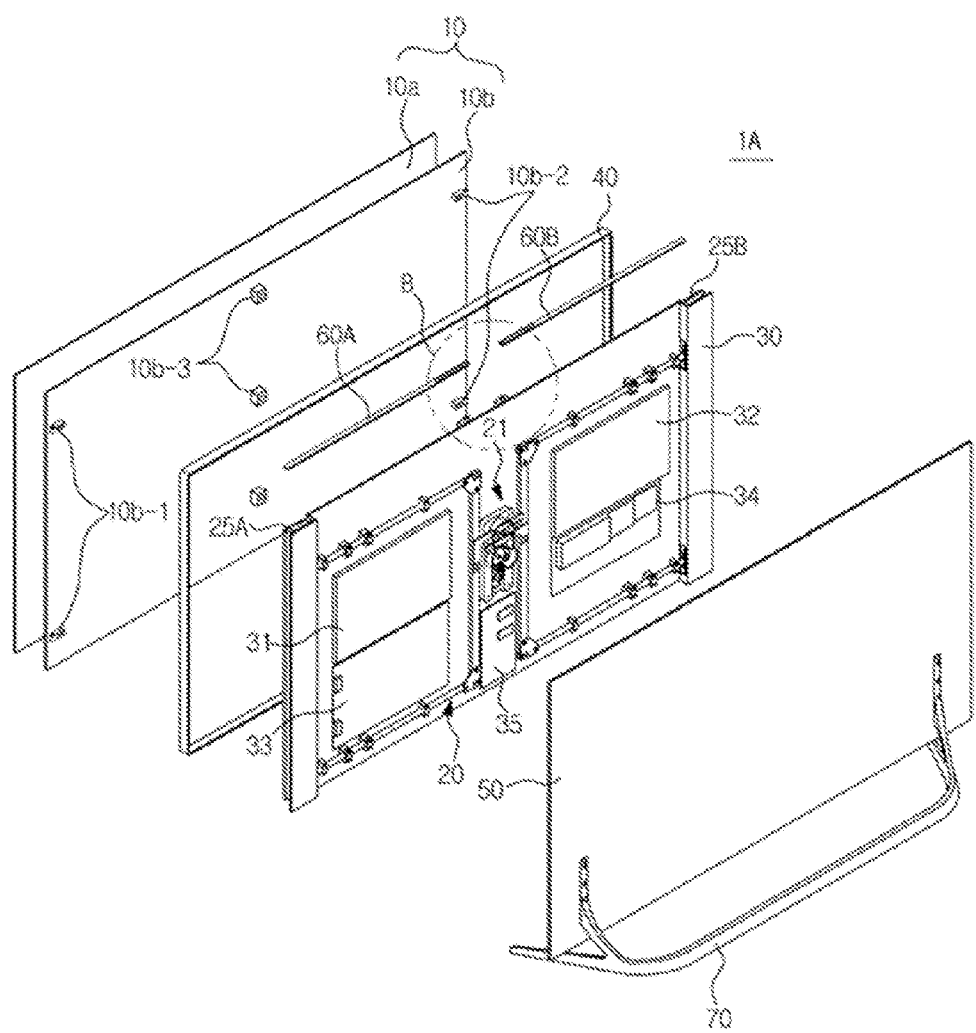
FIG. 5 is an exploded perspective view of the display apparatus according to an exemplary embodiment.

The display apparatus 1A including the display module 10 that may be deformed to have the flat surface state and the curved surface state, also includes a driving device 20 which is shown in FIG. 5 that deforms the display module 10 to have the flat surface state and the curved surface state, a base member 30 which is also shown in FIG. 5 that is installed in the rear of the display module 10 and supports the driving device 20, a side case 40 that constitutes the sides of the display apparatus 1A, a rear case 50 that constitutes a rear side of the display apparatus 1A, and a stand 70 that is separately installed at the base member 30 using the side case 40 and/or the rear case 50 so that the display apparatus 1A may be installed in an upright position. Also, although not shown, the display apparatus 1A according to one or more exemplary embodiments may be fixed to a wall using a wall-mounted bracket, instead of the stand 70. In this example, the wall-mounted bracket may be separately installed at the rear case 50 or may be separately installed at the base member 30 using the rear case 50.

For example, the display module 10 may include a self-luminous display device that emits light by electrically exciting fluorescent organic compounds, such as an organic light emitting diode (OLED), or a light-receiving display device that uses a separate light source, such as a liquid crystal display (LCD).

Figure 6:
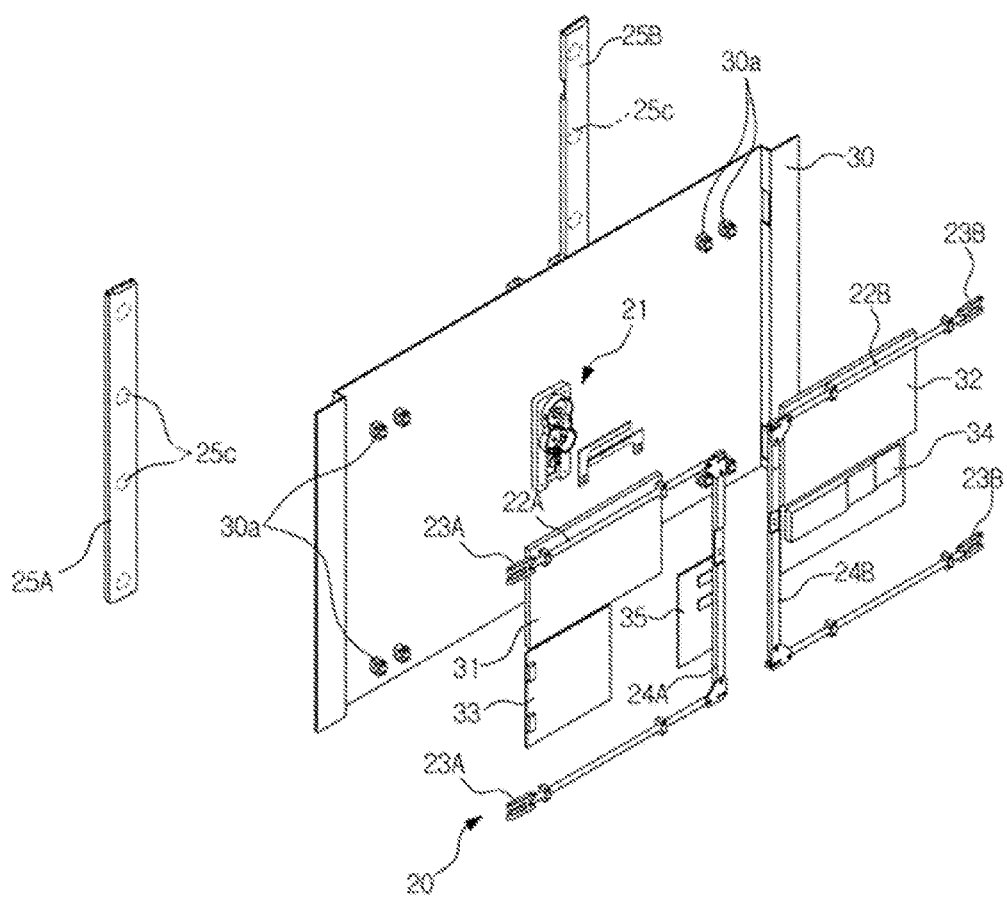
FIG. 6 is an exploded perspective view of a driving device of the display apparatus according an exemplary embodiment.
Figure 7:
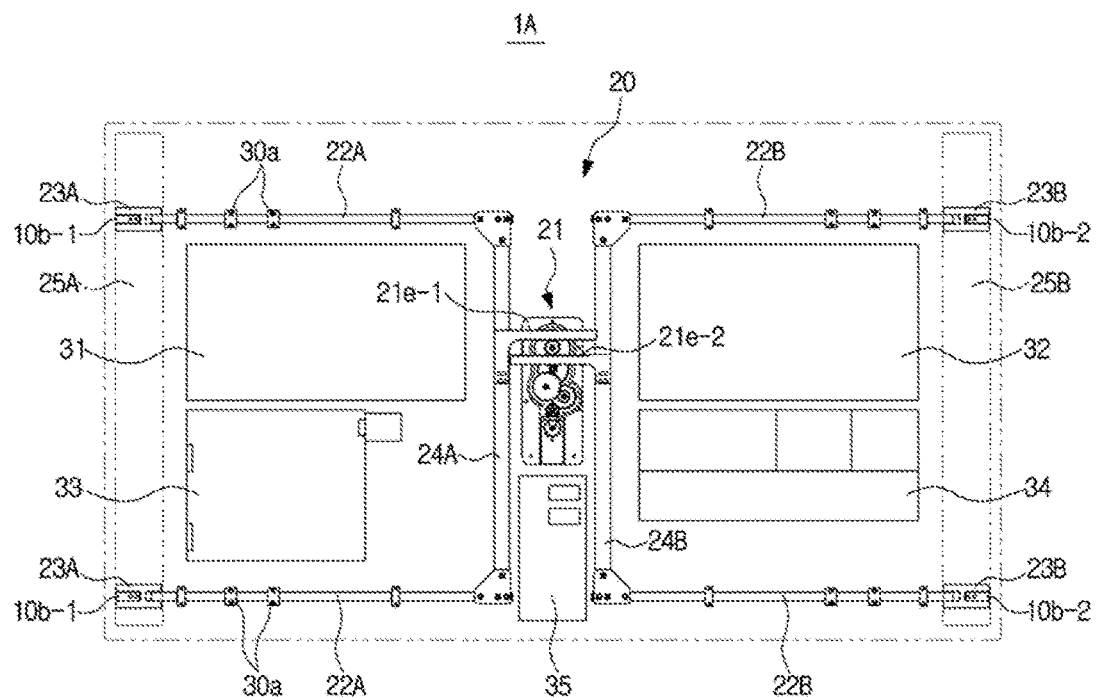
FIG. 7 is a rear view of the driving device of the display apparatus according to an exemplary embodiment.

In the examples shown in FIGS. 5 through 7, the display module 10 includes a display panel 10a which in this example is formed as an OLED panel and a support panel 10b that is formed in a shape corresponding to the display panel 10a and supports a rear side of the display panel 10a.

In this case, a part of the display module 10 is fixed to the base member 30. In this example, a part of the display module 10 is fixed to the base member 30 using at least one stub member 10b-3 fixed to a rear side of the support panel 10b so that central ends of the display module 10 are prevented from moving forward.

The driving device 20 is fixed to the base member 30 and causes the display module 10 to be deformed from one of a flat surface state in which the display module 10 has a flat surface and a curved surface state in which both ends of the display module 10 protrude forward rather than in the central direction, to the other one thereof, based on the base member 30 such that the display module 10 may be used both in the flat surface state and the curved surface state.

Figure 9:
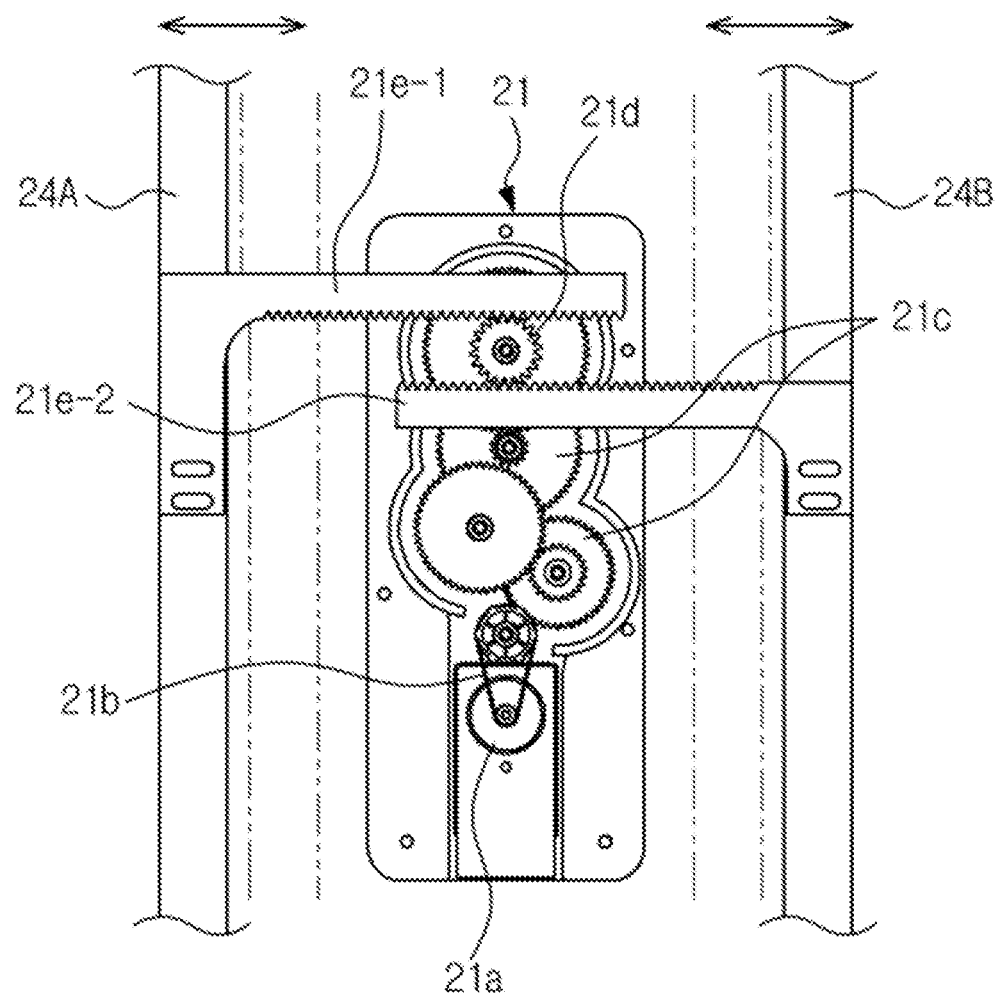
FIG. 9 is a rear view of a driving unit of the display apparatus according to an exemplary embodiment.

The driving device 20 includes a driving unit 21 that is disposed in the center of the rear of the display module 10 and generates a deformable driving force so that both sides of the display module 10 may be symmetrical. In addition, a plurality of movement members 22A and 22B that move to be symmetrical in opposite directions based on the driving unit 21 by receiving the driving force from the driving unit 21, and a plurality of rotation members 23A and 23B that are rotatably installed, rotate by movement of the plurality of movement members 22A and 22B and cause both sides of the display module 10 to move in a forward/backward direction. Because the driving unit 21 is fixed to the base member 30, the display module 10 is deformed from the flat surface to the curved surface or from the curved surface to the flat surface based on the base member 30. The driving unit 21 is disposed at the center of the rear of the display module 10, as described above. This causes distances between the driving unit 21 and both ends of the display module 10 to be substantially the same. When the driving unit 21 is disposed in this manner, the driving force generated in the driving unit 21 may be uniformly transferred to both sides of the display module 10. Thus, both ends of the display module 10 may be deformed so that they are symmetrical to each other based on the driving unit 21. FIG. 9 is a rear view of a driving unit 21 of the display apparatus.

The plurality of movement members 22A and 22B include a first movement member 22A that moves straight toward one side of a widthwise direction of the display module 10 in response to receiving the driving force from the driving unit 21 and a second movement member 22B that moves straight in an opposite direction to that of the first movement member 22A in response to receiving the driving force from the driving unit 21.

The plurality of rotation members 23A and 23B include a first rotation member 23A of which one end is rotatably installed at the first movement member 22A and the other end is rotatably installed at a first end of the display module 10 and which rotates together with movement of the first movement member 22A and causes the first end of the display module 10 to move in the forward/backward direction. The rotation members also include a second rotation member 23B of which one end is rotatable installed at the second movement member 22B and the other end is rotatably installed at a second end of the display module 10 and which rotates together with movement of the second movement member 22B and causes the second end of the display module 10 to move in the forward/backward direction.

In that example, two first movement members 22A are spaced apart from each other in a vertical direction. Two first movement members 22A are connected to each other using a first connection member 24A that extends along in the vertical direction and move together. Also, two second movement members 22B are spaced apart from each other in the vertical direction. The two second movement members 22B are connected to each other using a second connection member 24B that extends along in the vertical direction.

A pair of first hinge members 10b-1 in which the other ends of two first rotation members 23A are rotatably installed, are installed at a portion of the rear side of the display module 10 to be spaced apart from each other in the vertical direction, and a pair of second hinge members 10b-2 in which the other ends of two second rotation members 23B are rotatably installed, are installed at the other portion of the rear side of the display module 10 to be spaced apart from each other in the vertical direction.

Figure 8:
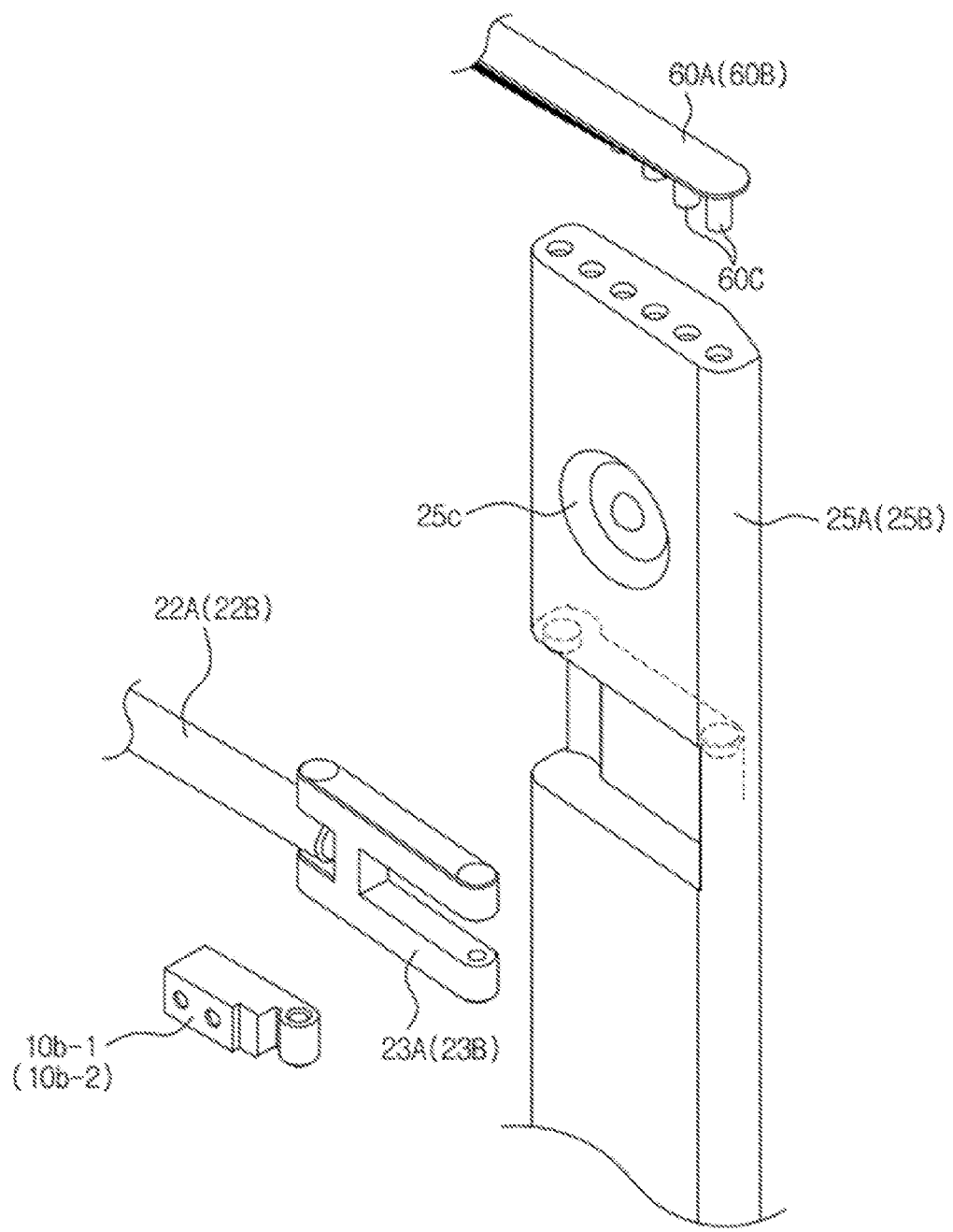
FIG. 8 is an exploded perspective view of movement members, rotation members, and a shield module of the display apparatus according to an exemplary embodiment.

Also, the display apparatus 1A includes a first shield module 25A which extends along in the vertical direction and has upper and lower portions at which the first rotation members 23A are installed, and a second shield module 25B which extends along in the vertical direction and has upper and lower portions at which the second rotation members 23B are installed, as illustrated in FIGS. 5 and 7. The first shield module 25A and the second shield module 25B may be fixedly installed at the first rotation members 23A and the second rotation members 23B, as illustrated in FIG. 8, and include a plurality of speakers 25c disposed in the first shield module 25A and the second shield module 25B in the vertical direction and which output sound by receiving sound signals.

Also, in this example, the first shield module 25A and the second shield module 25B cover a part of a space between both ends of the display module 10 that protrudes forward when the display module 10 is deformed to have the curved or otherwise deformed surface state, and the side case 40. Also, as described above, each of the first shield module 25A and the second shield module 25B may include the plurality of speakers 25c and may serve as a speaker module.

In this example, front sides of the first shield module 25A and the second shield module 25B are placed adjacent to the rear side of the display module 10 in a state in which the display module 10 is formed as a flat surface. In a state in which the display module 10 is deformed in a curved surface, the front sides of the first shield module 25A and the second shield module 25B become slightly far away from the rear side of the display module 10. That is, the front sides of the first shield module 25A and the second shield module 25B become farther away from each other. Thus, the audio quality or size of a sound transferred to the display apparatus 1A when the display module 10 is deformed to have the curved surface and the quality or size of sound transferred to the display apparatus 1A when the display module 10 is formed to have the flat surface may be different from each other.

To address this, in one or more exemplary embodiments, the speakers 25c included in the first shield module 25A and the second shield module 25B may be controlled so that settings of the quality or size of a sound or volume generated as the display module 10 is deformed may be changed to correspond to deformation of the display module 10.

The driving unit 21 is connected to a power substrate 31 an example of which is further described herein and operates by receiving power from the power substrate 31. The driving unit 21 includes a driving motor 21a that generates a rotational force, a belt 21b and gears 21c for deceleration and power transmission, and a first rack 21e-1 and a second rack 21e-2 that are moved by a pinion 21d (as shown in FIG. 9) so that a rotation motion may be changed into a straight motion.

Thus, the rotational force generated in the driving motor 21a may be decelerated by the belt 21b and the gears 21c and transferred to the pinion 21d so that the pinion 21d may be rotated and the first rack 21e-1 and the second rack 21e-2 are moved by rotation of the pinion 21d.

In this example, two first movement members 22A are connected to the first rack 21e-1 using the first connection member 24A and move together with the first rack 21e-1. Two second movement members 22B are connected to the second rack 21e-2 using the second connection member 24B and move together with the second rack 21e-2.

Referring back to FIG. 5, the base member 30 is formed of a rectangular plate that corresponds to the display module 10 and supports the rear of the display module 10, and the driving unit 21 is installed at the center of the base member 30.

The driving device 20 may cause both ends of the display module 10 to move backward so that the display module 10 may be deformed to the point where it has the flat surface state corresponding to the base member 30 or may cause both ends of the display module 10 to be moved forward so that the display module 10 may be deformed to have the curved surface state. In this example, the base member 30 may change only the curvature of the display module 10 while an original shape of the base member 30 is maintained.

In this example, the driving unit 21 is installed in the center of a rear side of the base member 30 so that the driving force generated in the driving unit 21 may be transferred to upper and lower portions of the display module 10. However, one or more exemplary embodiments are not limited thereto, and the driving unit 21 may be installed at an upper or lower portion of the center of the base member 30.

Also, a plurality of movement guides 30a in which the first movement members 22A and the second movement members 22B are movably installed, are disposed on the base member 30. The plurality of movement guides 30a are used to guide the horizontal movement of the first movement members 22A and the second movement members 22B. In the present example, four pairs of movement guides 30a are disposed on the base member 30 so that each of two first movement members 22A and two second movement members 22B are movably supported by a pair of movement guides 30a.

Also, one or more printed circuit boards (PCBs), such as PCBs 31, 32, 33, and 35 for controlling the display apparatus 1A may be disposed at the rear side of the base member 30. The PCBs 31, 32, 33, and 35 disposed at the rear side of the base member 30 may include the power substrate 31 that is connected to an external power supply and may supply power to the display apparatus 1, a signal processing substrate 32 may be used for processing various image and sound signals, a panel driving substrate 33 that is connected to a display panel 10a using a cable and may be used to control driving of the display panel 10a, and a timing control substrate 35 that transmits the image signals to the display panel 10a. An auxiliary speaker 34, such as a woofer speaker, may also be installed. In this example, the above-described driving unit 21 is disposed between the power substrate 31 and the signal processing substrate 32, and the timing control substrate 35 is disposed at a lower side of the driving unit 21.

In the present example, the above-described PCBs 31, 32, 33, and 35 are installed at the rear side of the base member 30. However, one or more embodiments are not limited thereto, and the PCBs 31, 32, 33, and 35 may be installed at the rear case 50.

Figure 10:
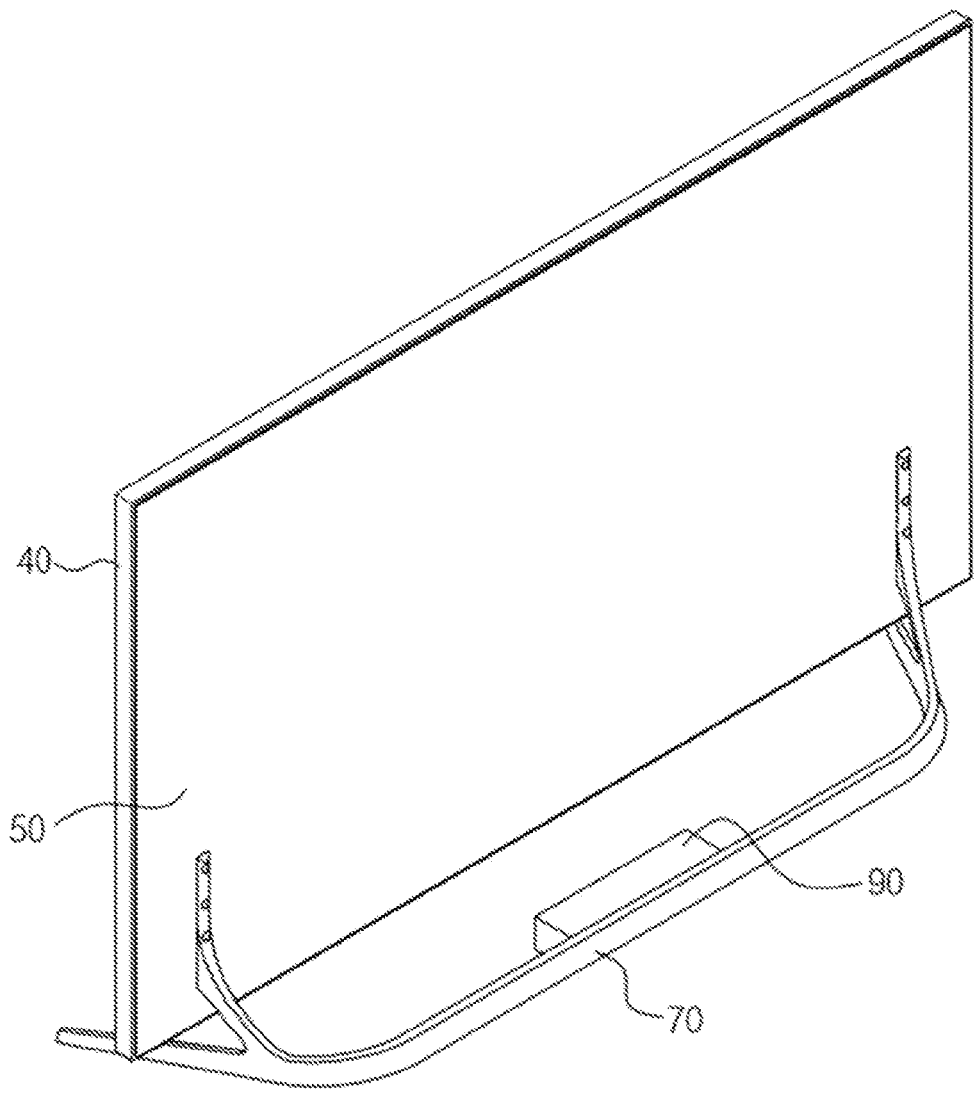
FIG. 10 is a rear perspective view of a display apparatus according to another exemplary embodiment.
Figure 11:
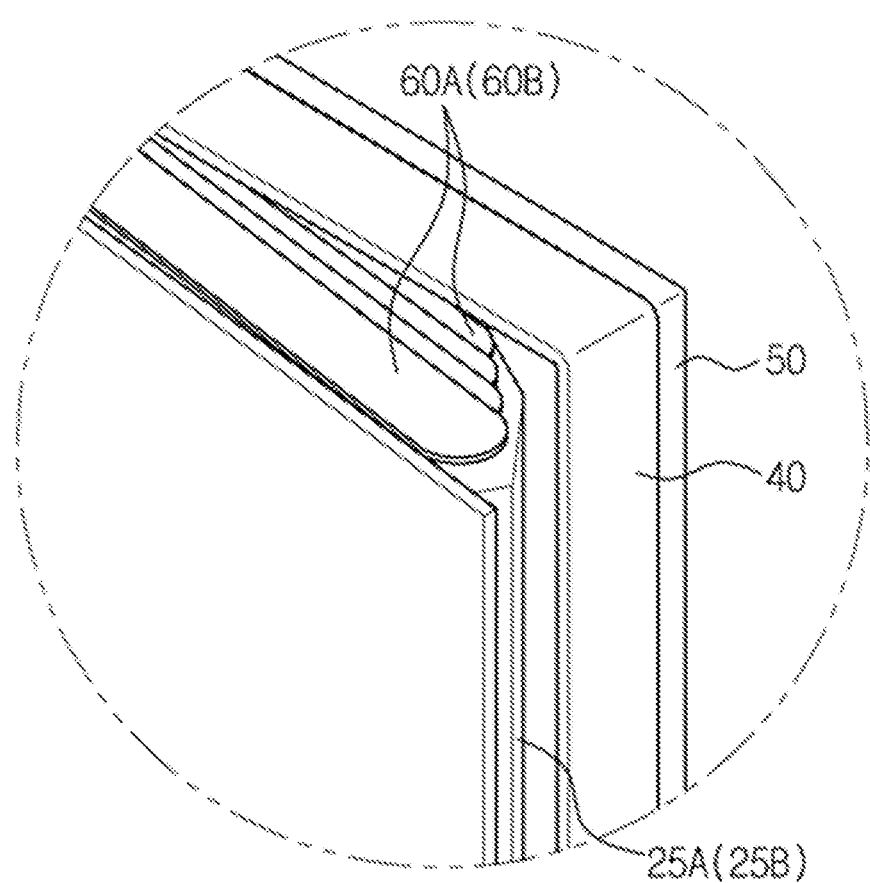
FIG. 11 is an enlarged view of a portion A of FIG. 2 according to an exemplary embodiment.

As another example, the PCBs 31, 32, 33, and 35 may also be installed at another additional member according to design. Also, as illustrated in FIG. 10, after PCBs are included in one control module 90, the PCBs may be separately installed at an outer portion of the display module 10. In FIG. 10, the control module 90 is installed and connected to the stand 70. The control module 90 may also be installed at various positions.

Referring again to FIGS. 11 through 14, the display apparatus 1A includes cover members 60A and 60B that cover a space between a top end or a bottom end of the display module 10 and the side case 40 or the rear case 50.

For example, the cover members 60A and 60B may be formed of plates each having a large length in a horizontal direction and which are stacked in the vertical direction. The cover members 60A and 60B include a plurality of first cover members 60A of which one end is installed in the center of a top end of the base member 30 to be movable and rotatable in a widthwise direction of the display module 10 and the other end is rotatably installed at a top end of the first shield module 25A, and a plurality of second cover members 60B of which one end is installed in the center of the top end of the base member 30 to be movable and rotatable in the widthwise direction of the display module 10 and the other end is rotatably installed at a top end of the second shield module 25B.

Cover guide holes 60d that extend along the horizontal direction are disposed in one end of the first cover members 60A and one end of the second cover members 60B so that one end of the first cover members 60A and one end of the second cover members 60B may be rotatably installed. Hinge protrusions 60C are formed on the other end of the first cover members 60A and the other end of the second cover members 60B to be rotatably installed on a top end of the first shield module 25A and a top end of the second shield module 25B in a line.

In this example, the space between the top end, the bottom end and the side case 40 is covered by the plurality of first cover members 60A and the plurality of second cover members 60B. However, one or more exemplary embodiments are not limited thereto, and a cover member may be formed to have one or more wrinkles, and thus, may be formed as a bellows sheet of which one side is fixed to the display module 10 and the other side is fixed to the side case 40 or the rear case 50.

A first guide pin 35A is disposed at the center of the top end of the base member 30 to sequentially perforate the cover guide holes 60*d* formed in the first cover members 60A and a second guide pin 35B is disposed in the center of the top end of the base member 30 to sequentially perforate the cover guide holes 60*d* formed in the second cover members 60B.

The side case 40 accommodates the display module 10, the base member 30, and the driving device 20. In this example, the side case 40 is formed in the form of a rectangular ring and includes four sides (up, down, left, and right) of the display apparatus 1A. However, one or more exemplary embodiments are not limited thereto. For example, side case 40 may be formed to include only a part of the sides, such as an upper side or left and right sides or an upper portion or left and right sides, or may be formed as a one body, or may have separated sides.

The rear case 50 is formed as a rectangular plate that corresponds to the side case 40 and covers the rear of the base member 30 and the driving device 20.

Figure 15:
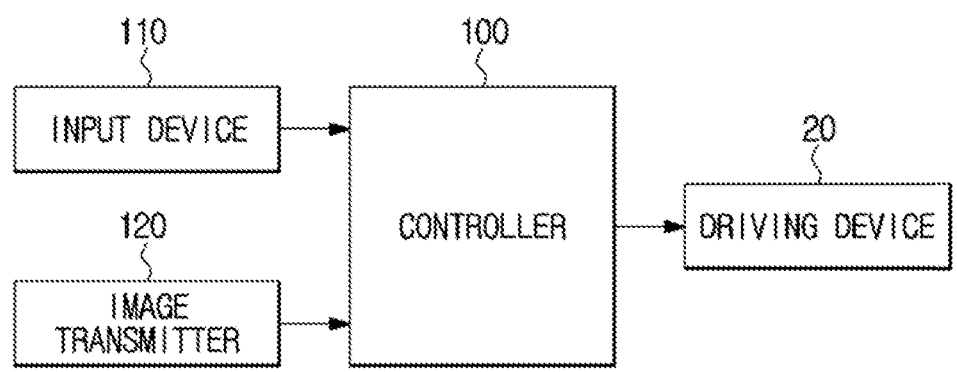
FIG. 15 is a block diagram of the display apparatus according to an exemplary embodiment.

Alternatively, the display apparatus 1A having the above configuration may include a controller 100 (shown in FIG. 15) that controls the display apparatus 1A and the driving device 20 included in the display apparatus 1A, and various types of input devices 110 (shown in FIG. 15) that allow user's instructions to be input, such as through a button disposed on a remote controller or the display apparatus 1A.

According to one or more exemplary embodiments, the display apparatus 1A having the above configuration may cause the display module 10 to be automatically deformed to have the flat surface state or the curved surface state based on a type of content to be displayed or that is being displayed on the display module 10. For example, the display apparatus 1A may cause the display module 10 to be in the flat surface state using the driving device 20 when content such as news is to be displayed or is input to the display apparatus 1A. As another example, when content to be displayed on the display module 10 is a movie, the display apparatus 1A may cause the display module 10 to be in the curved surface state using the driving device 20.

For example, information regarding a type of content that is to be displayed or that is being displayed may be directly input by the user to the display apparatus 1 using the input device 110 (such as that shown in FIG. 15), or may be transmitted from an image transmitter 120 (shown in FIG. 15), such as a broadcasting station, together with the image signals.

Also, when the user selects a manual mode through the user interface of the display apparatus 1A, the user manipulates the input device 110 manually so that the driving device 20 may cause the display module 10 to have one of the flat surface state and the curved surface state based on a manual input by the user.

Figure 17:
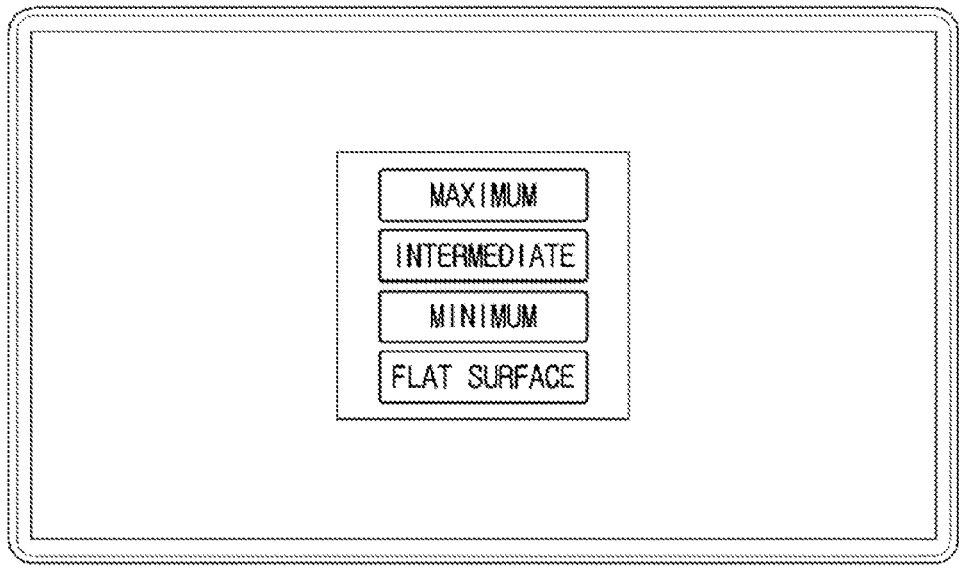
FIG. 17 illustrates the user interface screen on which a curvature of the display module may be selected manually, of the display apparatus according to an exemplary embodiment.

For example, in the manual mode, a user interface of the display apparatus 1A shown in FIG. 17 appears on a screen, and the user may manually select the display module 10 to be deformed to have a flat surface, a minimum curvature, an intermediate curvature, and a maximum curvature through the user interface and the input device 110. In this example, the first shield module 25A and the second shield module 25B are installed at the first rotation members 23A and the second rotation members 23B and are rotated together with the first rotation members 23A and the second rotation members 23B. However, one or more exemplary embodiments are not limited thereto. The first shield module 25A and the second shield module 25B may be fixedly installed at the rear side of the display module 10 or the base member 30.

Also, the display module 10 is deformed to have one of the flat surface state and the curved surface state in which the display module 10 is deformed to have a predetermined curvature. However, one or more exemplary embodiments are not limited thereto, and the curvature of the display module 10 may be continuously changed in a predetermined range or in a multi-stage manner according to the user's selection. For example, the amount of curvature of the display module 10 may have a range and is not limited to a purely flat surface or a maximum curved surface, and may have a plurality of settings therebetween.

For example, the display apparatus 1A may be controlled so that, when the user presses the button disposed at the remote controller to control the curved surface of the display apparatus 1A, the curvature of the display module 10 may be continuously deformed in proportion to an amount of pressing time or in a multi-stage manner, like in the flat surface→the minimum curvature→the intermediate curvature-→the maximum curvature→the flat surface, in proportion to the number of times the button is pressed.

This may be used to cope with changes in various usage conditions, such as the number of people who are viewing the display apparatus 1A.

Also, in the present example, the entire display module 10 is deformed to have a predetermined curvature. However, one or more exemplary embodiments are not limited thereto. As another example, only a central part of the display module 10 may be deformed, and both ends thereof may be maintained in the flat surface state, or the central part and both ends of the display module 10 may be deformed to have different curvatures according to design.

Also, in the present example, the button disposed at the remote controller or the display apparatus 1A has been described as the input device 110. However, the exemplary embodiments are not limited thereto. For example, a motion detecting device that detects the user's motion or a voice recognition device that recognizes the user's voice may also be used as the input device 110. As another example, a touch pad, joystick mouse, and the like may also be used.

In some embodiments, the side case 40 and the rear case 50 are separately manufactured and are coupled to each other. However, in some embodiments the side case 40 and the rear case 50 may be integrally formed as one case.

Figure 18:
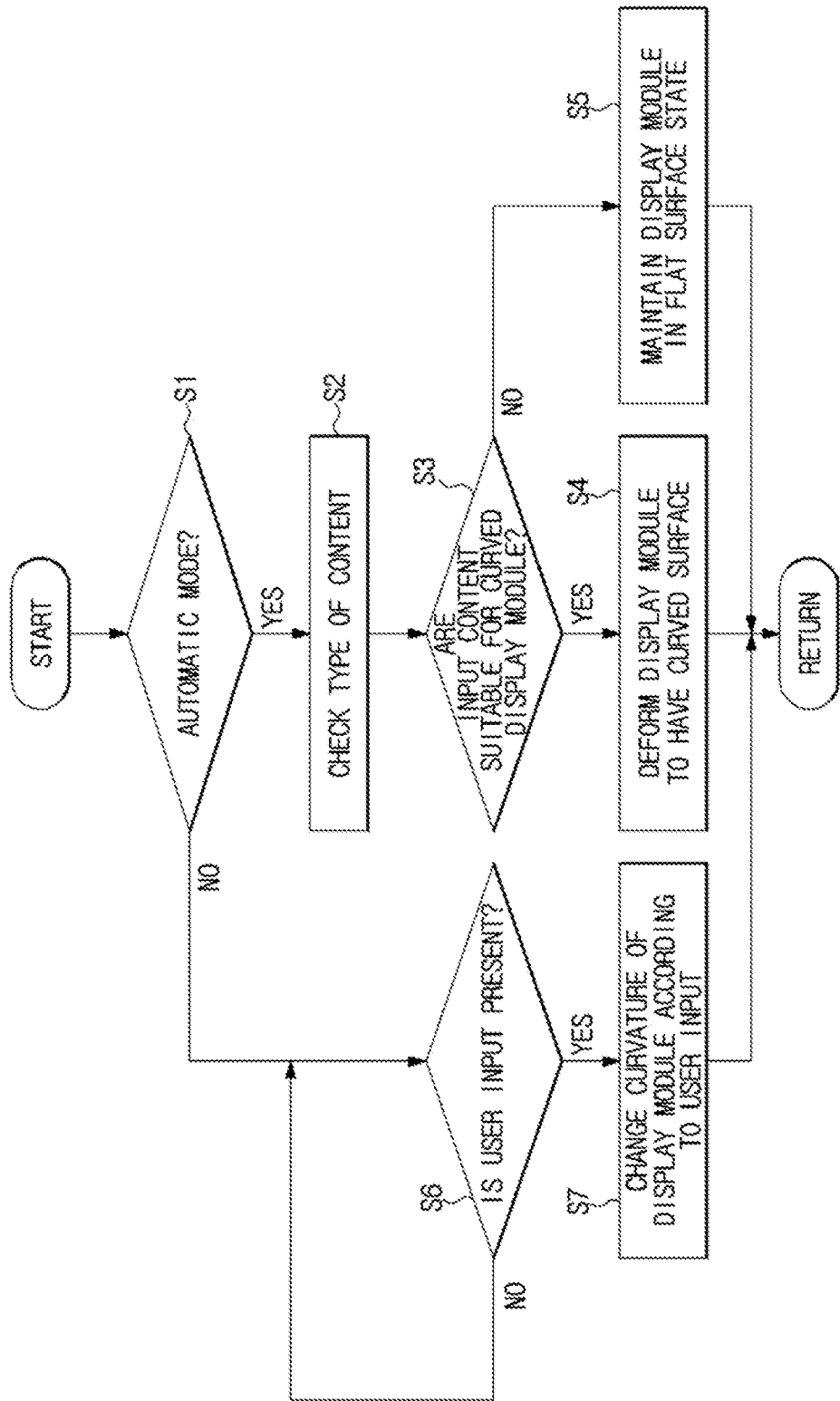
FIG. 18 is a flowchart illustrating a method of controlling the display apparatus, according to an exemplary embodiment.

Next, a method of controlling the display apparatus according to an exemplary embodiment is described with reference to FIG. 18.

First, it is checked whether a mode set by the user through the user interface is an automatic mode (S1), if the mode is the automatic mode, a type of content to be input by the user or a transmitter is checked (S2). Subsequently, it is checked whether the input content is suitable for a display module 10 having a curved surface (S3). If the content is suitable for the display module 10 having the curved surface, the display module 10 is deformed to have a curved surface (S4).

However, if the input content is not suitable for the display module 10 having the curved surface, the display module 10 is maintained in a flat surface state (S5).

Referring again to (S1), if the mode set by the user through the user interface is not the automatic mode, it is checked whether a user input using the input device 110 is present (S6). If it is determined that no user input is present, an operation of checking whether the user input using the input device 110 is present, is repeatedly performed until the user input is present.

When it is determined that the user input using the input device 110 is present, the display module 10 is maintained in the flat surface state based on the user input, or a curvature of the display module 10 is changed (S7).

Figure 19:
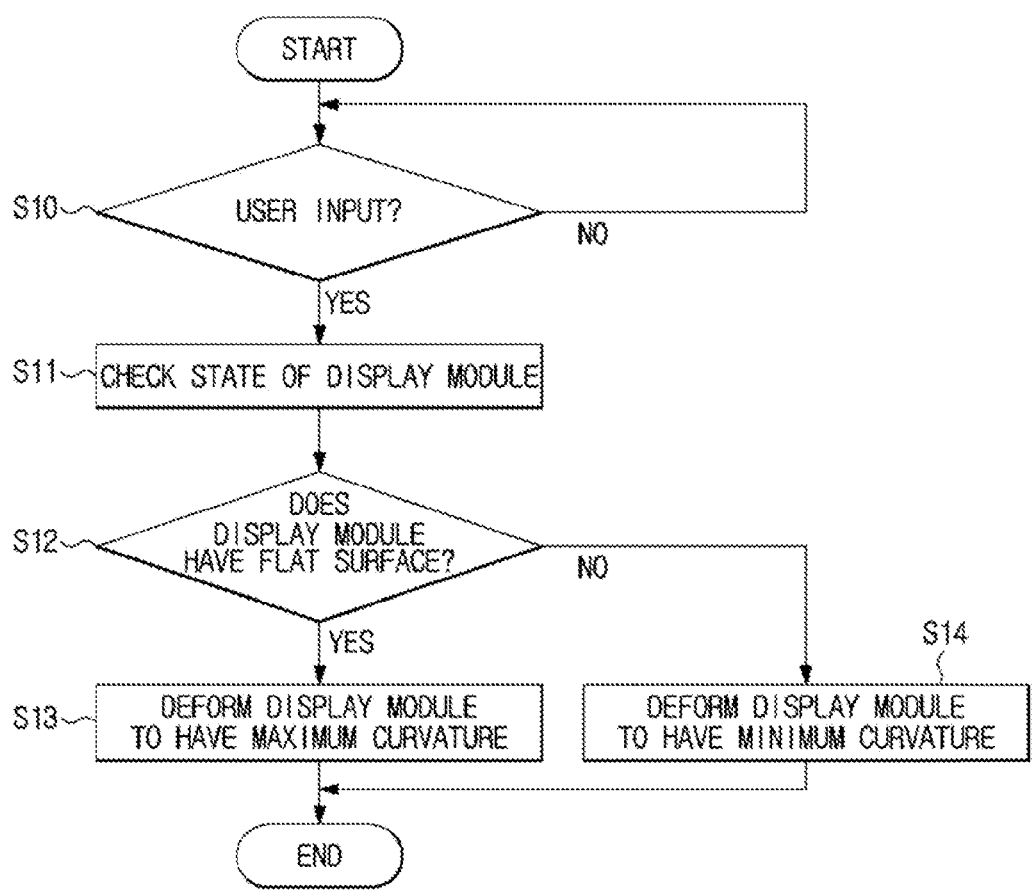
FIG. 19 is a flowchart illustrating a method of controlling the display apparatus, according to another exemplary embodiment.

Next, a method of controlling the display apparatus according to another exemplary embodiment is described with reference to FIG. 19.

First, it is determined whether a user input using the input device 110 is present (S10), and if the user input is present, a state of the display module 10 is checked (S11).

Subsequently, it is determined whether the state of the display module 10 is in a flat surface state (S12). If the display module 10 is in the flat surface state, the display module 10 is deformed to have a maximum curvature (S13).

However, if it is determined that the display module 10 is not in the flat surface state, the display module 10 is deformed to have a minimum curvature, i.e., a flat surface state (S14).

It should be appreciated that the above-described example method of controlling the display apparatus 1A may be applied to a case where the display module 10 is changed from one of a curved surface and a flat surface to the other one thereof based on an input using the input device 110.

Figure 20:
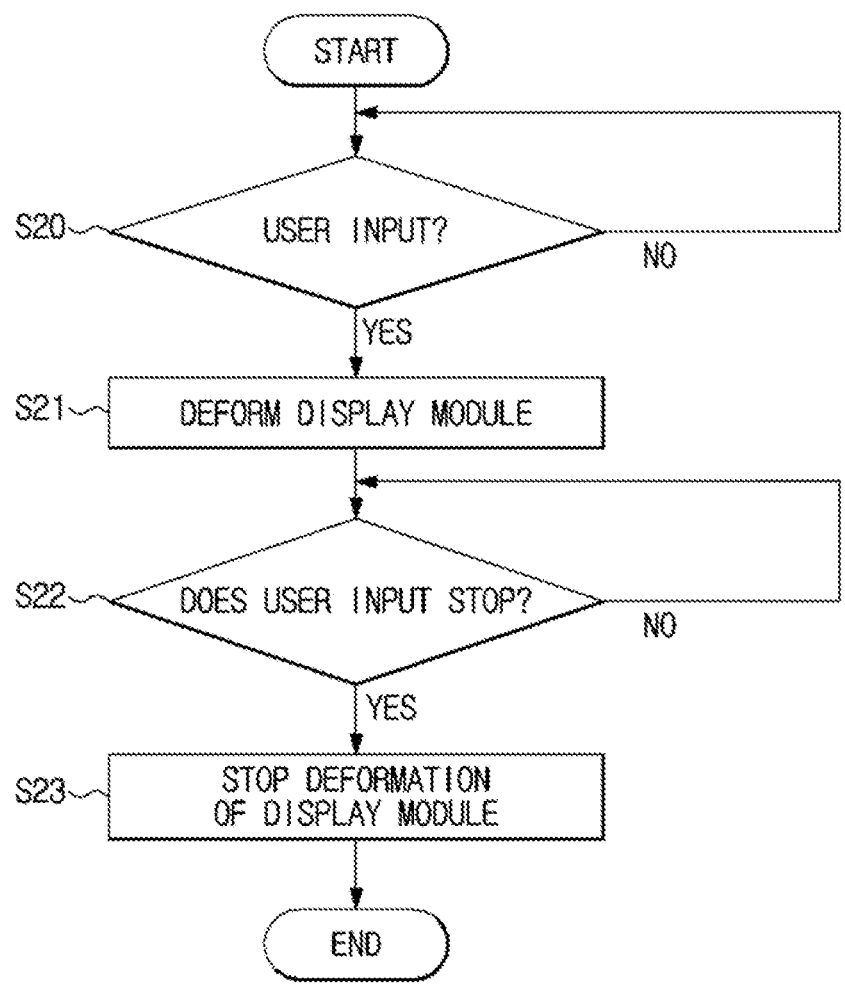
FIG. 20 is a flowchart illustrating a method of controlling the display apparatus, according to another exemplary embodiment.

Next, a method of controlling the display apparatus 1A according to another embodiment is described with reference to FIG. 20.

First, it is determined whether a user input using the input device 110 is present (S20), and when the user input is present, the display module 10 is deformed (S21).

Next it is determined whether the user input stops when the display module 10 is deformed (S22), and when the user input stops, deformation of the display module 10 stops (S23), and when it is determined that the user input does not stop, deformation of the display module 10 is continuously performed.

The above-described example method of controlling the display apparatus 1A may be applied to an example in which the display module 10 is continuously changed in proportion to an instruction input time using the input device 110.

Figure 21:
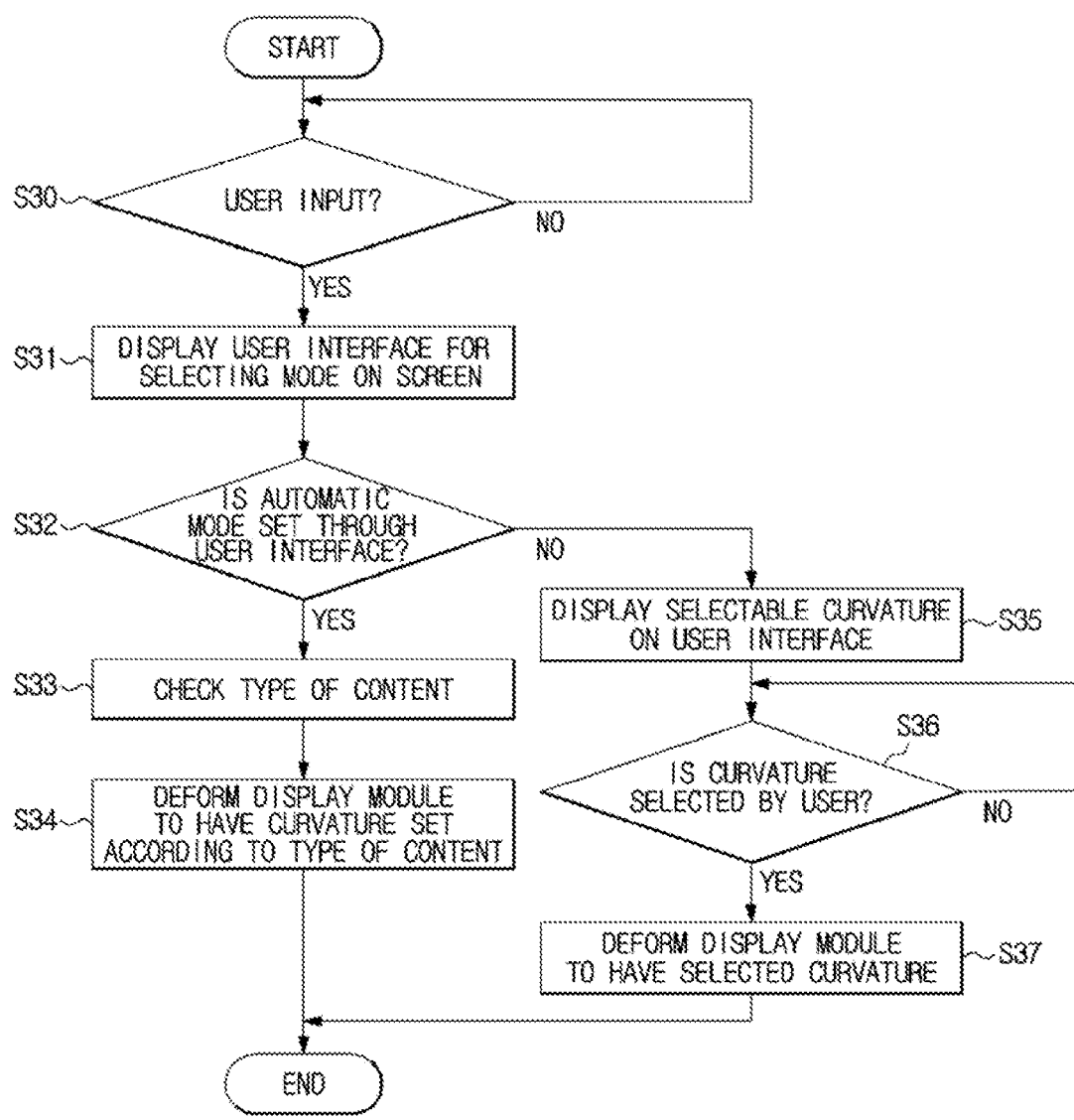
FIG. 21 is a flowchart illustrating a method of controlling the display apparatus, according to another exemplary embodiment.

Next, a method of controlling the display apparatus according to another embodiment is described with reference to FIG. 21.

Figure 16:
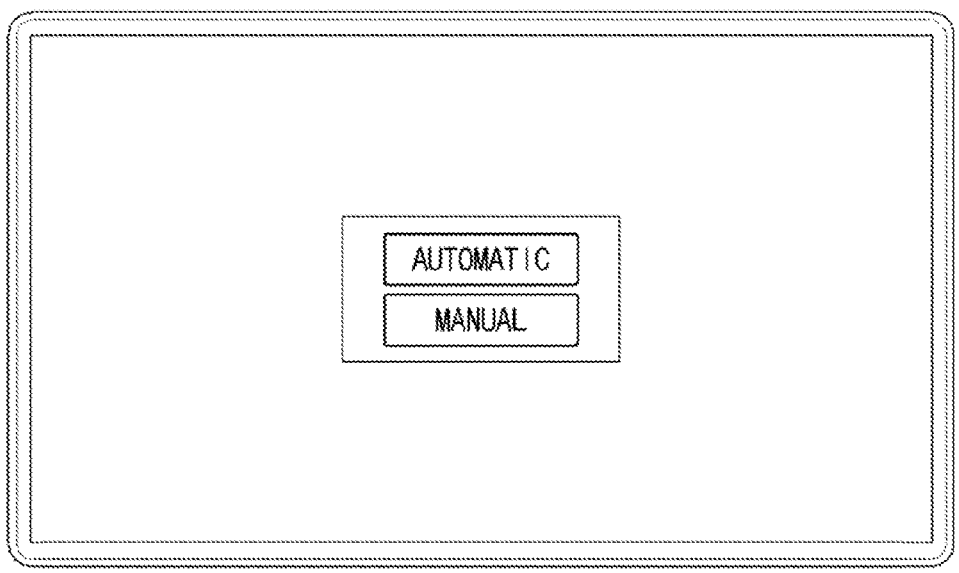
FIG. 16 illustrates a user interface screen on which deformation of a display module may be selected automatically or manually, of the display apparatus according to an exemplary embodiment.

First, it is determined whether a user input using the input device 110 is present (S30), and when the user input is present, a user interface (see FIG. 16) for selecting a mode is displayed on a screen of the display apparatus 1A (S31).

Next it is determined whether an automatic mode is set through the user interface (S32), and when it is determined that the automatic mode is set through the user interface, a type of content to be displayed on the display apparatus 1A is checked (S33), and the display module 10 is deformed to have a curvature set according to the type of content (S34).

When it is determined that the automatic mode is not set through the user interface, a curvature that may be selected is displayed on the user interface (see FIG. 17) (S35).

Subsequently, it is determined whether the curvature is selected by the user (S36), and when it is determined that the curvature is selected by the user, the display module 10 is deformed to have the selected curvature (S37).

The above-described example method of controlling the display apparatus 1A may be applied to an example in which the user may set the curvature of the display module 10 automatically or manually through the user interface displayed on the screen of the display apparatus 1A.

Figure 22:
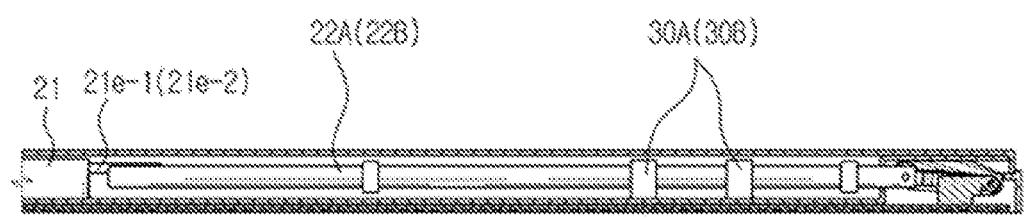
FIG. 22 is a cross-sectional view of the driving device of the display module in the curved surface state of the display apparatus according to an exemplary embodiment.
Figure 23:
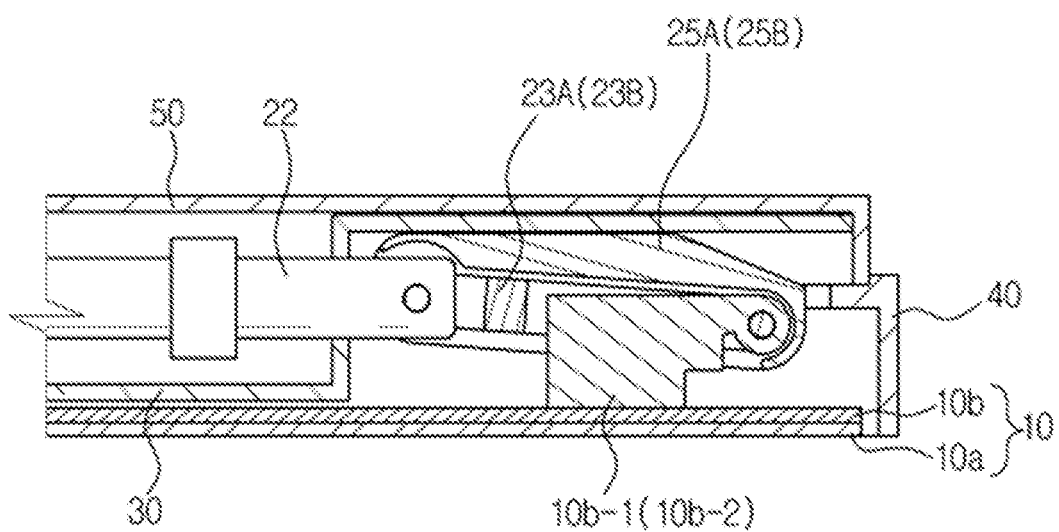
FIG. 23 is a cross-sectional plan view of the movement members and the rotation members of the display module in the flat surface state of the display apparatus according to an exemplary embodiment.

First, when the display module 10 is used in the flat surface state, as illustrated in FIGS. 22 and 23, and the user manipulates the input device 110, such as the button disposed at the remote controller or the display apparatus 1A, the pinion 21*d* is rotated in one direction when the driving motor 21*a* is rotated. Also, the first rack 21*e*-1 that engages with an upper side of the pinion 21*d* as the pinion 21*d* is rotated in one direction, is moved in a first direction toward a first side end of a first display module 10, and the second rack 21*e*-2 that engages with a lower side of the pinion 21*d* is moved in a second direction toward a second side end of the first display module 10 placed at an opposite side to the first side end.

Because two first movement members 22A are connected to the first rack 21*e*-1 using the first connection member 24A, the two first movement members 22A move in the first direction together with the first rack 21*e*-1. Also, because the two second movement members 22B are connected to the second rack 21*e*-2 using the second connection member 24B, two second movement members 22B move in the second direction together with the second rack 21*e*-2. In this case, movement of the first movement member 22A and movement of the second movement member 22B are guided by movement guides 30*a* which are installed at the base member 30.

As the first movement members 22A move, the first rotation members 23A rotate around one end connected to the first movement members 22A and push the first side end of the display module 10 forward. Also, as the second movement members 22B move, the second rotation members 23B rotate around one end that is connected to the second movement members 22B and push the second side end of the display module 10 in a relative forward direction.

Figure 24:
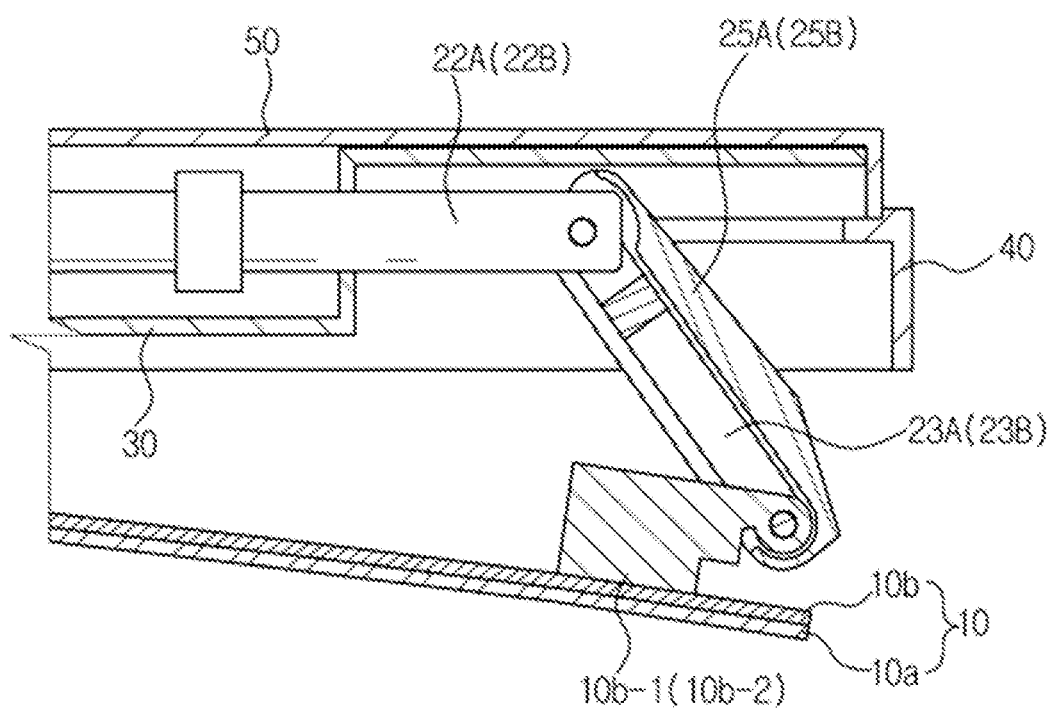
FIG. 24 is a cross-sectional plan view of the movement members and the rotation members of the display module that is deformed to have a curved surface of the display apparatus according to an exemplary embodiment.

For example, as illustrated in FIG. 24, both ends of the display module 10 may protrude forward using the first rotation members 23A and the second rotation members 23B. On the other hand, the central portion of the display module 10 may be fixed to the base member 30 using the stub member 10*b*-3. Accordingly, the display module 10 may be deformed to have a shape in which both ends of the display module 10 protrude forward rather than in the central portion of the display module 10. In this example, the display module 10 is deformed in such a way that the front side of the display module 10 has an overall predetermined curvature.

Because the first shield module 25A and the second shield module 25B are installed at the first rotation member 23A and the second rotation member 23B, respectively, the first shield module 25A and the second shield module 25B are rotated together with the first rotation member 23A and the second rotation member 23B such that front sides of the first shield module 25A and the second shield module 25B are spaced apart from the rear side of the display module 10 by a very small distance.

Accordingly, because the speakers 25*c* of the first shield module 25A and the second shield module 25B are controlled such that at least one of the quality and the size of sound may be further deformed as the display module 10 is deformed to have the curved surface, changes in sound that may occur as front sides of the first shield module 25A and the second shield module 25B are spaced apart from the rear side of the display module 10, may be compensated for.

The controller 100 adjusts a volume of sound or a level of sound in a certain range of frequencies according to varied curvatures of the display module 10, thereby allowing the optimum sound for each curvature of the display module 10 to be output. In this case, the sound may be generated from a sound bar or a home theater system disposed outside the display apparatus in addition to speakers 25c disposed inside the display apparatus 1A.

Figure 12:
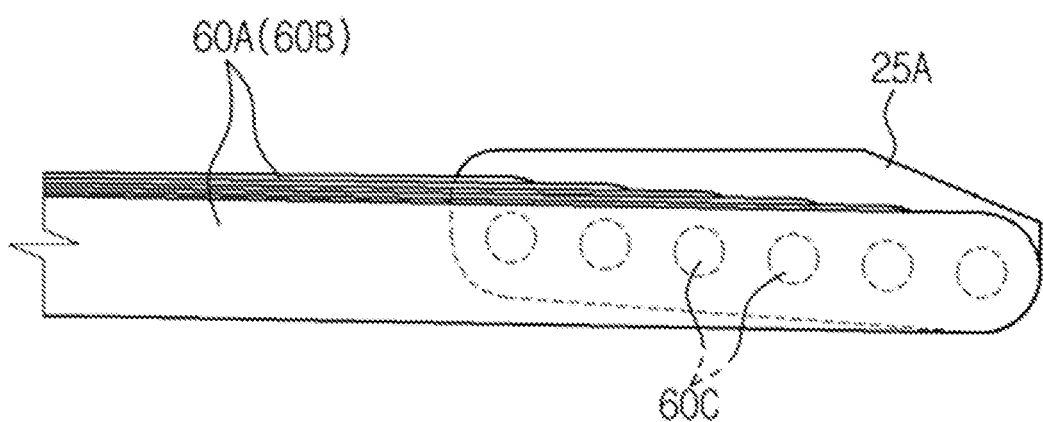
FIG. 12 is a plan view of cover members and the shield module of the display module in the flat surface state of the display apparatus according to an exemplary embodiment.
Figure 13:
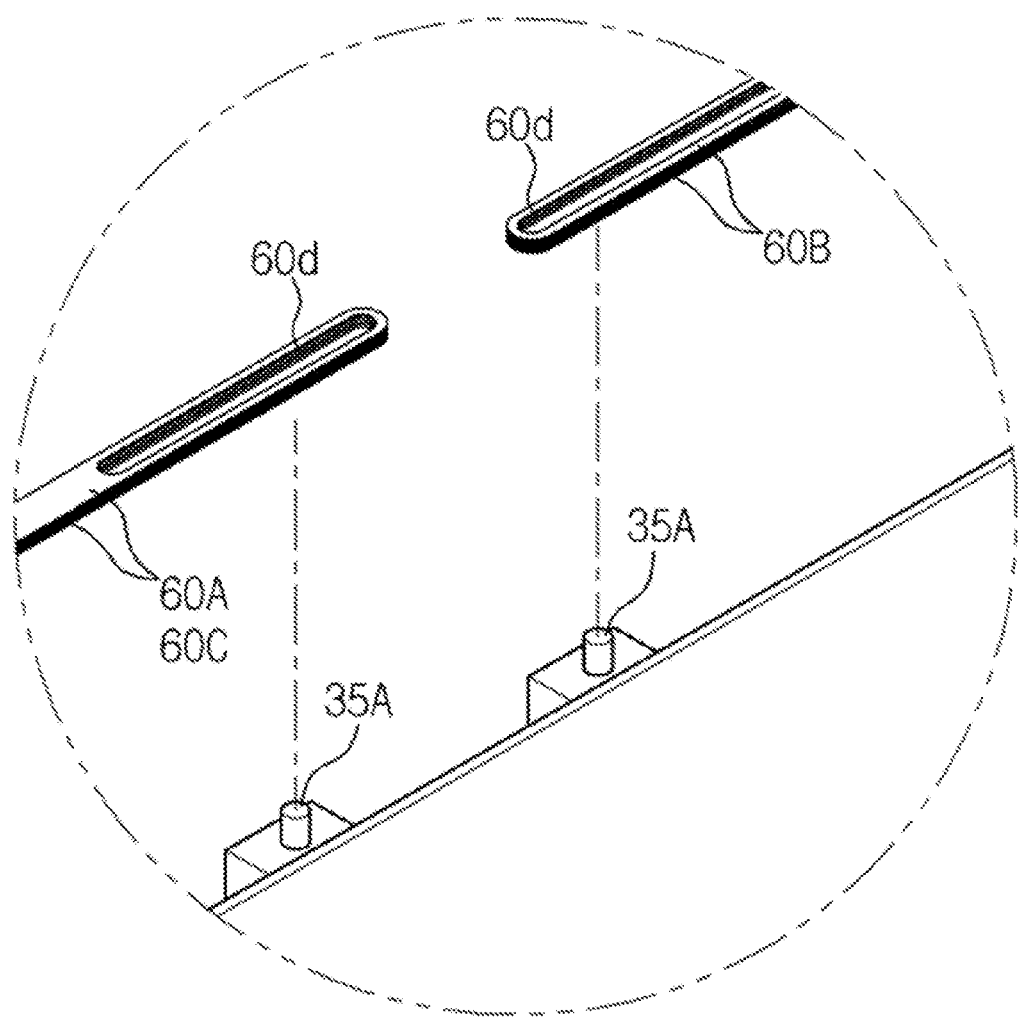
FIG. 13 is an enlarged view of a portion B of FIG. 5 according to an exemplary embodiment.
Figure 14:
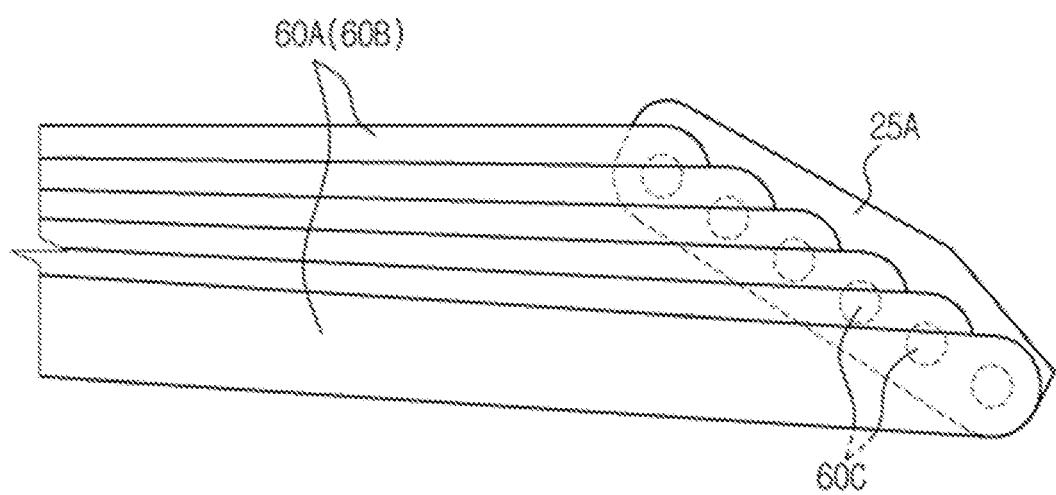
FIG. 14 is a plan view of cover members and the shield module of the display module in the curved surface state of the display apparatus according to an exemplary embodiment.

Also, as the first cover members 60A and the second cover members 60B are stacked in the vertical direction, as illustrated in FIG. 12, when the display module 10 is in the flat surface state, and as the display module 10 is deformed and both sides of an upper portion of the display module 10 and the side case 40 are spaced apart from each other, the first cover members 60A are moved and rotated around the first guide pin 35A, are unfolded in a fan shape, as illustrated in FIG. 14. The cover members 60A cover a space between one side of a top end of the display module 10 and an upper portion of the side case 40, and the second cover members 60B are moved and rotated around the second guide pin 35B, are unfolded in the fan shape and cover a space between the other side of the top end of the display module 10 and the upper portion of the side case 40. The result is that the introduction of foreign substances, such as dust, into the display apparatus 1A through a space between both ends of the deformed display module 10 and the side case 40 is prevented by the first cover members 60A and the second cover members 60B.

Also, when the user manipulates a switch or the remote controller in this state so that the display module 10 may be in the flat surface state, the driving motor 21a rotates in an opposite direction to the previous direction, and the pinion 21d is rotated in an opposite direction to the previous direction. In this example, as the pinion 21d rotates, the first rack 21e-1 that engages with an upper side of the pinion 21d is moved in the second direction, and the second rack 21e-2 that engages with a lower side of the pinion 21d is moved in the first direction.

Thus, two first movement members 22A move in the second direction together with the first rack 21e-1, and two second movement members 22B move in the first direction together with the second rack 21e-2.

As the first movement members 22A move in the second direction, the first rotation members 23A rotate around one end connected to the first movement members 22A in an opposite direction to the previous rotation direction and push the first side end of the display module 10 in a backwards direction. Also, as the second movement members 22B move in the first direction, the second movement members 22B rotate around one end connected to the second movement members 22B in an opposite direction to the previous rotation direction and push the second side end of the display module 10 in the backwards direction.

Because both ends of the display module 10 that protrude forward are moved backward by the first rotation members 23A and the second rotation members 23B and are placed on the same plane as that of the display module 10, the display module 10 is again in the flat surface state.

As the first rotation members 23A and the second rotation members 23B are moved to their original positions, the first shield module 25A and the second shield module 25B are moved to their original positions, and the above-described first cover members 60A and second cover members 60B are moved to their original positions.

In this example, the driving device 20 causes two first movement members 22A connected to the first connection member 24A and two second movement members 22B connected to the second connection member 24B to simultaneously move in opposite directions. This may more stably deform both ends of the display module 10, however, it should be appreciated that one or more exemplary embodiments are not limited thereto.

Figure 25:
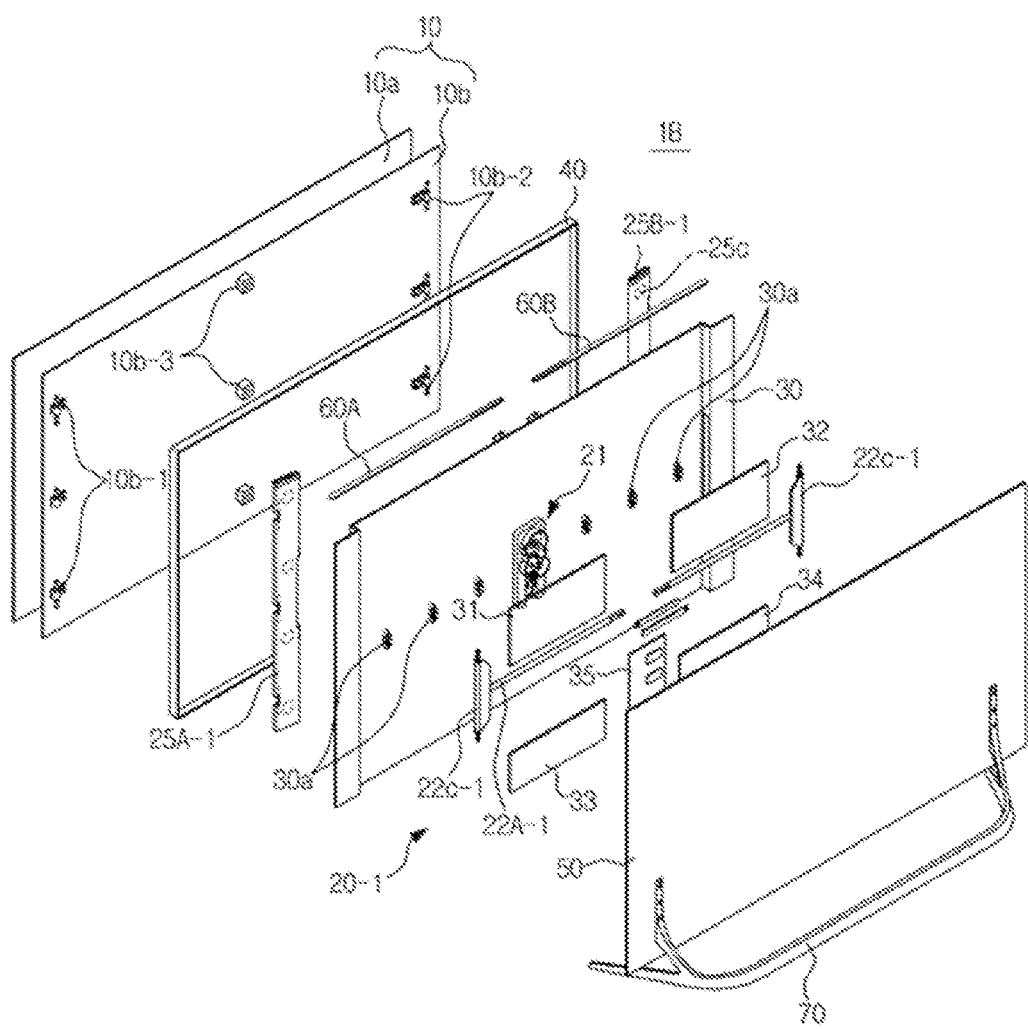
FIG. 25 is an exploded perspective view of a display apparatus according to another exemplary embodiment.
Figure 26:
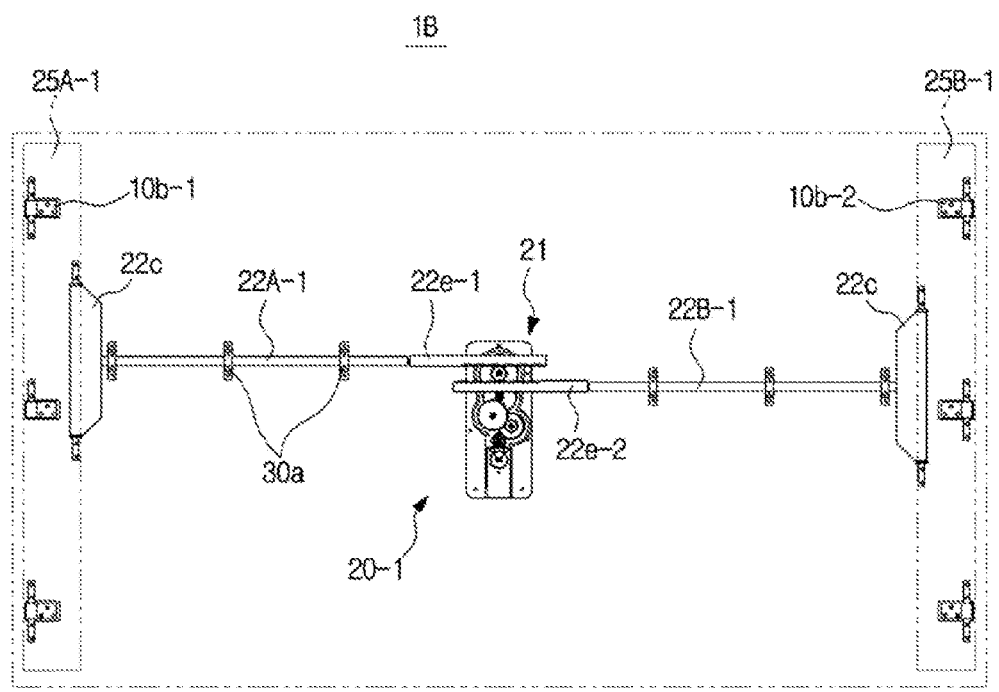
FIG. 26 is a rear view of a driving device of the display apparatus according to another exemplary embodiment.

FIGS. 25 and 26 illustrate a display apparatus 1B according to another exemplary embodiment.

As illustrated in FIGS. 25 and 26, a driving device 20-1 includes one first movement member 22A-1 and one second movement member 22B-1.

The first movement member 22A-1 is configured in such a way that one end of the first movement member 22A-1 is directly connected to a first rack 21e-1 and the other end of the first movement member 22A-1 may be rotatably installed at a first shield module 25A-1. The second movement member 22B-1 is configured in such a way that one end of the second movement member 22B-1 is directly connected to a second rack 22e-2 and the other end of the second movement member 22B-1 is rotatably installed at a second shield module 25B-1.

Hinge portions are disposed at the other ends of the first movement member 22A-1 and the second movement member 22B-1, extend to have predetermined widths in the vertical direction, and are rotatably installed at the first shield module 25A-1 or the second shield module 25B-1.

In this example, the first shield module 25A and the second shield module 25B are rotatably installed at a rear side of a display module 10 using a first hinge member 10b-1 and a second hinge member 10b-2 that are installed at the rear side of the display module 10.

Figure 27:
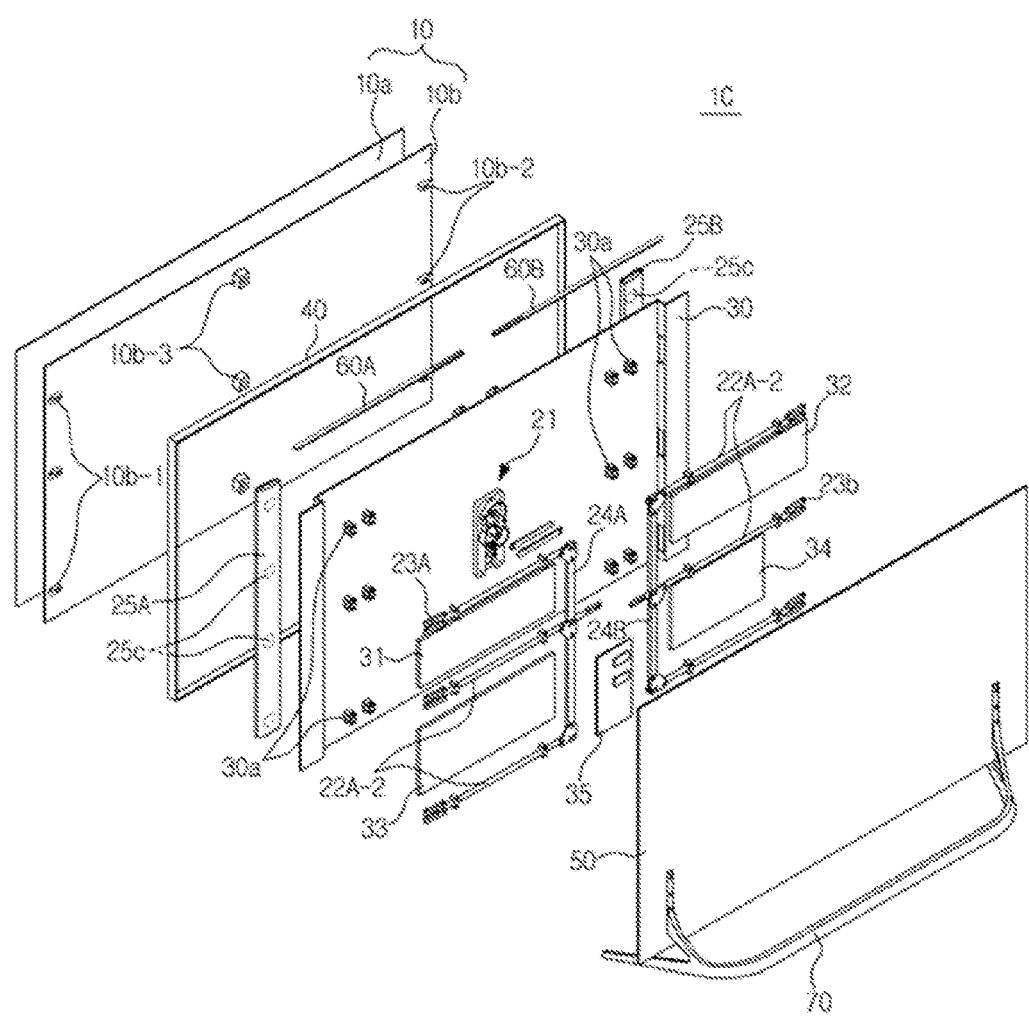
FIG. 27 is an exploded perspective view of a display apparatus according to another exemplary embodiment.
Figure 28:
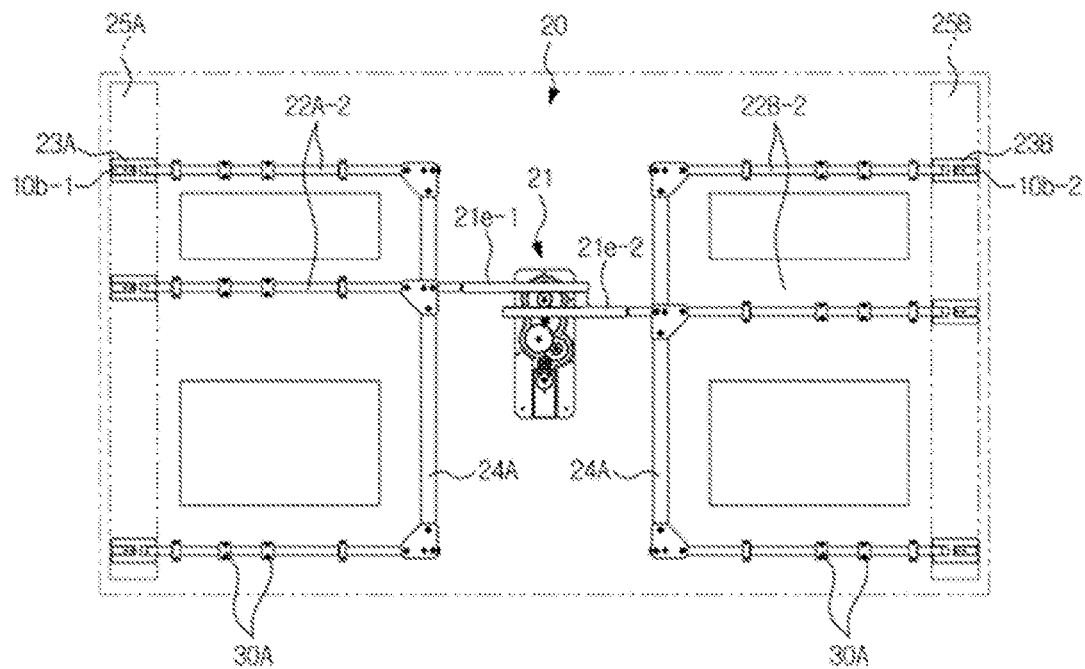
FIG. 28 is a rear view of a driving device of the display apparatus according to another exemplary embodiment.
Figure 29:
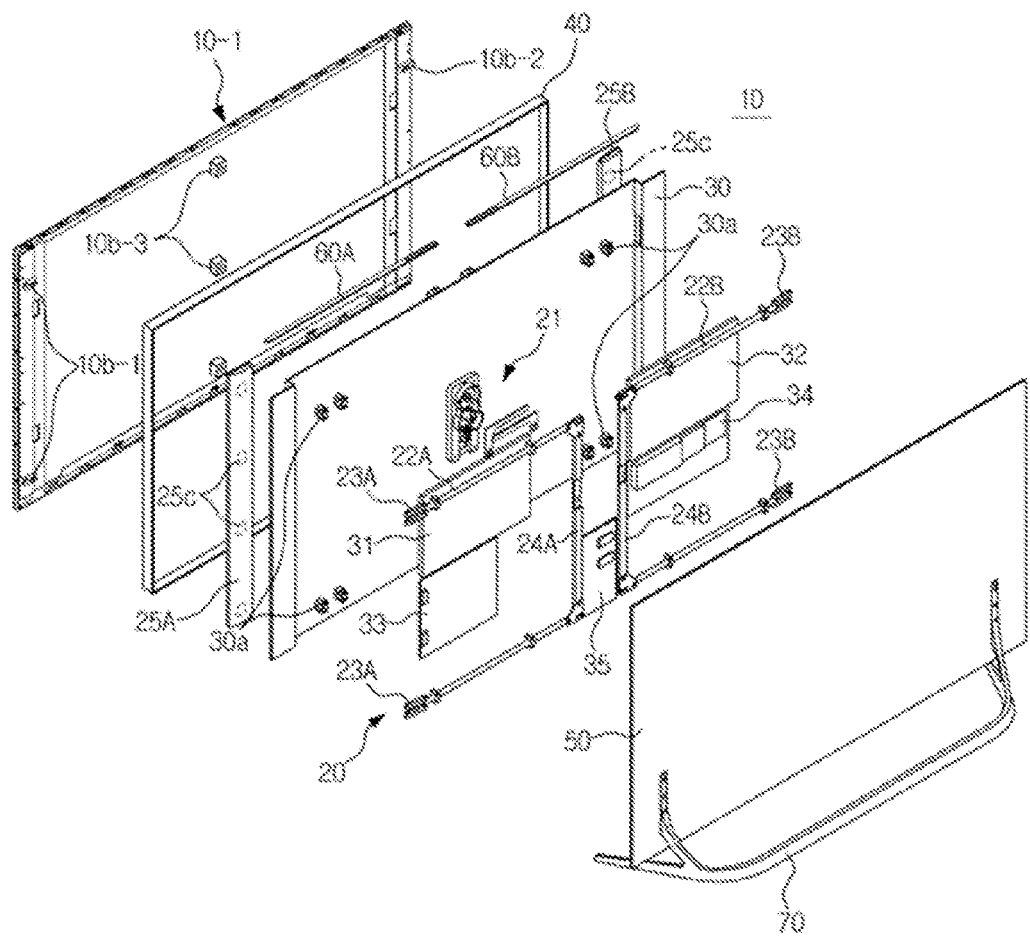
FIG. 29 is an exploded perspective view of a display apparatus according to another exemplary embodiment.

FIGS. 27 and 28 illustrate a display apparatus 1C according to other exemplary embodiments.

Also, as in a display apparatus 1C illustrated in FIGS. 27 and 28, a driving device 20-2 may include three first movement members 22A-2 that are spaced apart from each other in the vertical direction and connected to a first rack 21e-1 using a first connection member 24A and three second movement members 22B-2 that are spaced apart from each other in the vertical direction and connected to a second rack 21e-2 using a second connection member 24B.

When the driving device 20-2 is configured in this way, forces may be simultaneously applied to an upper portion, a lower portion, and an intermediate portion of both sides of a display module 10 using the first movement members 22A-2 and the second movement members 22B-2. The result is that the display module 10 may be more stably deformed rather than in a driving device including one or two first movement members and one or two second movement members.

It should be appreciated that the driving device may be include a variety of numbers of first movement members and second movement members to correspond to various types of display modules and should not be merely limited to the examples herein.

In one or more exemplary embodiments, because a display module including a display panel formed as an OLED panel may be light and may be easily deformed, the display module may be deformed by employing only one first movement member and one second movement member. On the other hand, because a display module including a relatively thicker liquid crystal panel than the display panel formed as the OLED panel and a backlight unit may be deformed only by a large force applied to the display module, the display module may be deformed by employing two or three first movement members and second movement members.

As another example, the display module including the liquid crystal panel and the backlight unit may be deformed by one first movement member and second movement member, like in the display module including the OLED panel. Accordingly, a driving device may be used by selectively changing the number of first movement members and second movement members, for example, based on a thickness, a type, a weight, and the like, of a display module used in a display apparatus.

In the above-described example, the display apparatus including a display panel 10a formed as the OLED has been described. However, one or more exemplary embodiments are not limited thereto. As another example, the display apparatus 1A may employ a display panel 10a-1 formed as a liquid crystal panel.

Figure 30:
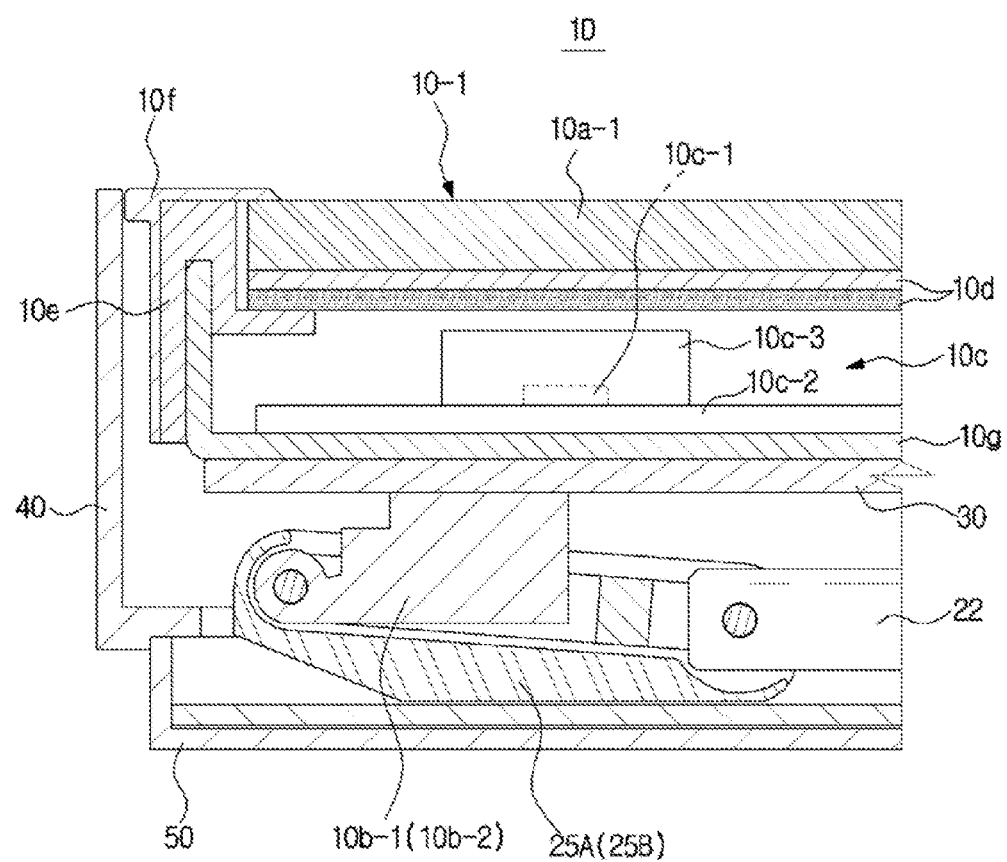
FIG. 30 is a cross-sectional plan view of a display apparatus according to another exemplary embodiment.

FIGS. 28 and 30 illustrate a display apparatus 1D according to another exemplary embodiment. The display apparatus 1D includes a display module 10-1 having a display panel 10a-1 formed as a liquid crystal panel.

The display module 10-1 includes the display panel 10a-1 formed as the liquid crystal panel, a backlight unit 10c that is disposed to be spaced apart from the rear of the display panel 10a-1 and irradiates the display panel 10a-1 with light, a plurality of optical sheets 10d disposed in the rear of the display panel 10a-1, a middle mold 10e that supports the display panel 10a-1, a front chassis 10f that is installed in the front of the middle mold 10e and which maintains the display panel 10a-1 to be installed at the middle mold 10e, and a rear chassis 10g that is installed in the rear of the middle mold 10e and which accommodates the backlight unit 10c.

In this example, the backlight unit 10c includes a plurality of light emitting diodes (LEDs) 10c-1 that directly irradiate a rear side of the display panel 10a-1 with light, a substrate 10c-2 on which the plurality of LEDs 10c-1 are mounted, and a lens 10c-3 that diffuses the light generated in the LEDs 10c-1.

For example, the display panel 10a-1 formed as the liquid crystal panel may include a glass substrate. A maximum curvature of the deformable display panel 10a-1 is in inverse proportion to the thickness of the glass substrate. For example, when the thickness of the glass substrate that constitutes the display panel 10a-1 is thin, the display panel 10a-1 may be deformed to have a large curvature. When the thickness of the glass substrate is thicker, the display panel 10a-1 may only be deformed to have a small curvature. As merely a non-limiting example, the display panel 10a-1 may be bent to have a curvature radius of 4000 mm or more.

As described above, the display module 10 including the display panel 10a-1 formed as the liquid crystal panel includes the backlight unit 10c, and thus, a predetermined thickness.

Thus, when the display module 10 is deformed, the curvature of the front chassis 10f that constitutes the front of the display module 10 may be deformed to a larger curvature than that of the rear chassis 10g that constitutes a rear side of the display module 10.

Figure 31:
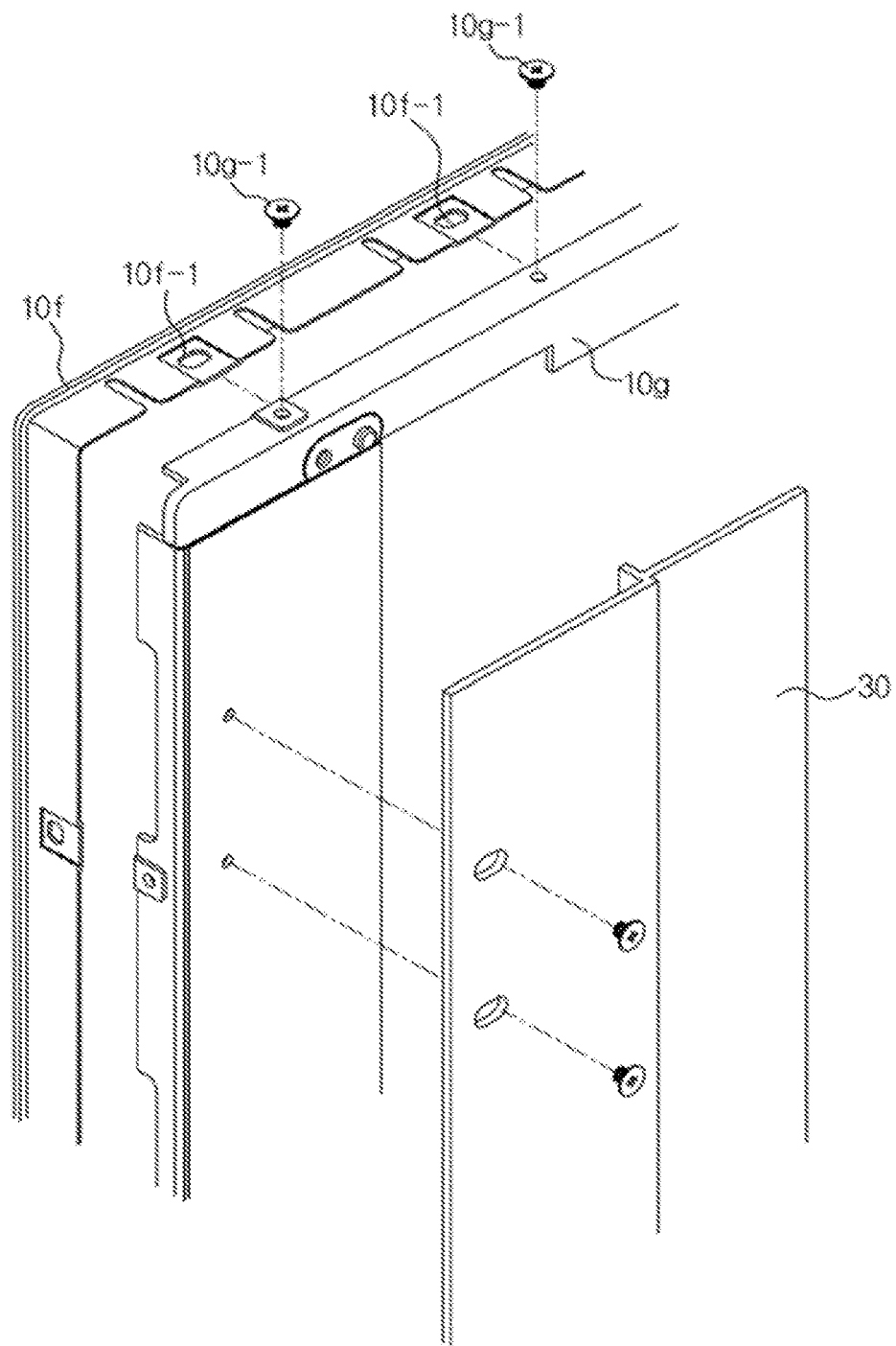
FIG. 31 is an exploded perspective view of a front chassis and a rear chassis of the display apparatus according an exemplary embodiment.

Thus, deformation guide holes 10f-1 that extend in a widthwise direction of the display module 10 are formed in the front chassis 10f so that the front chassis 10f may be deformed to have a curvature that is larger than that of the rear chassis 10f, as illustrated in FIG. 31. Guide screws 10g-1 pass through the deformation guide holes 10f-1 and are fastened to the rear chassis 10g.

Because the deformation guide holes 10f-1 extend in the widthwise direction of the display module 10, both sides of the front chassis 10f may move relative to both sides of the rear chassis 10g.

Figure 32:
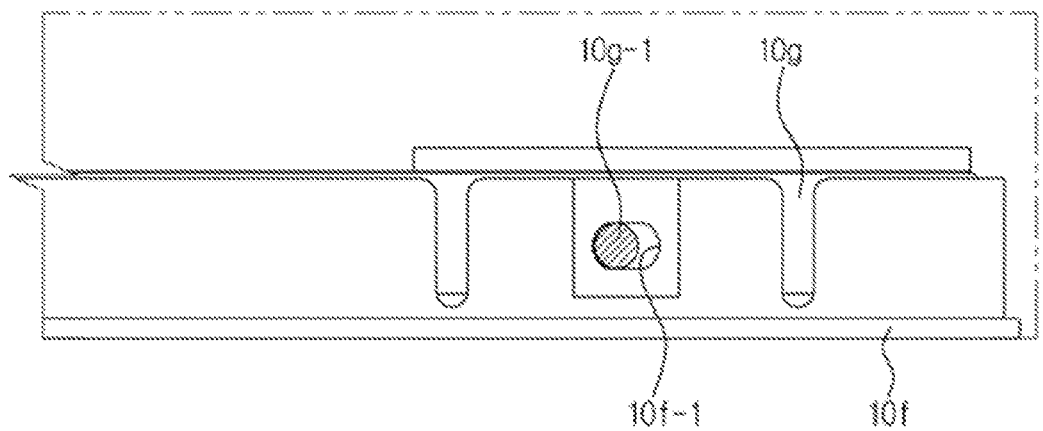
FIG. 32 is a plan view of the front chassis and the rear chassis of a display module in a flat surface state of the display apparatus according to an exemplary embodiment.
Figure 33:
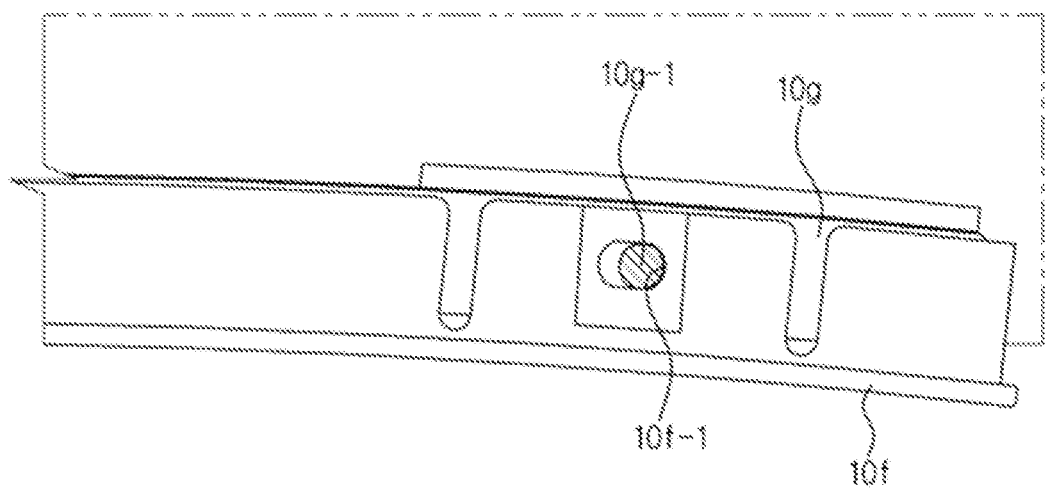
FIG. 33 is a plan view of the front chassis and the rear chassis of the display module that is deformed to have a curved surface of the display apparatus according to another exemplary embodiment.

As illustrated in FIG. 32, the display module 10 is in a flat surface state. The guide screws 10g-1 are placed at one side of each of the deformation guide holes 10f-1. As the display module 10 is deformed and is changed into a curved surface state, both ends of the front chassis 10f are moved relative to the rear chassis 10g in the widthwise direction of the display module 10, and the guide screws 10g-1 are placed at the other side of each deformation guide hole 10f-1, as illustrated in FIG. 33.

In this example, both ends of the front chassis 10f are moved relative to both ends of the rear chassis 10g so that the front chassis 10f and the rear chassis 10g may be deformed and have different curvatures.

In the fourth embodiment, the LEDs 10c-1 are installed to face the rear side of the display panel 10a-1 to directly irradiate the rear side of the display panel 10a-1 with light. However, one or more exemplary embodiments are not limited thereto.

Figure 34:
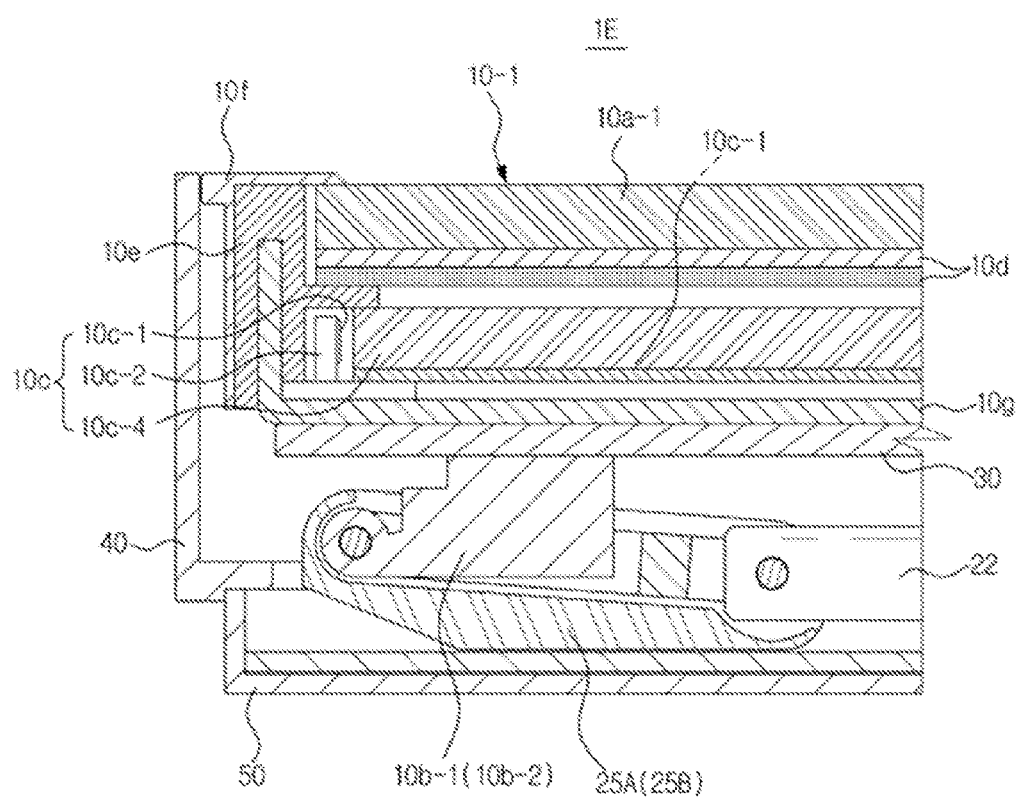
FIG. 34 is a cross-sectional view of movement members and rotation members of a display module in a flat surface state of a display apparatus according to another exemplary embodiment.

FIG. 34 illustrates a display apparatus 1E according to another exemplary embodiment.

In the display apparatus 1E shown in FIG. 34, light guide panels 10c-4 may be disposed in the rear of a display panel 10a-1, and LEDs 10c-1 may be disposed toward sides of the light guide panels 10c-4 to irradiate side ends of the light guide panels 10c-4 with light.

Also, in the above-described examples, the first shield module 25A and the second shield module 25B are rotated in the rear of the display module 10 or 10-1. However, one or more exemplary embodiments are not limited thereto.

Figure 35:
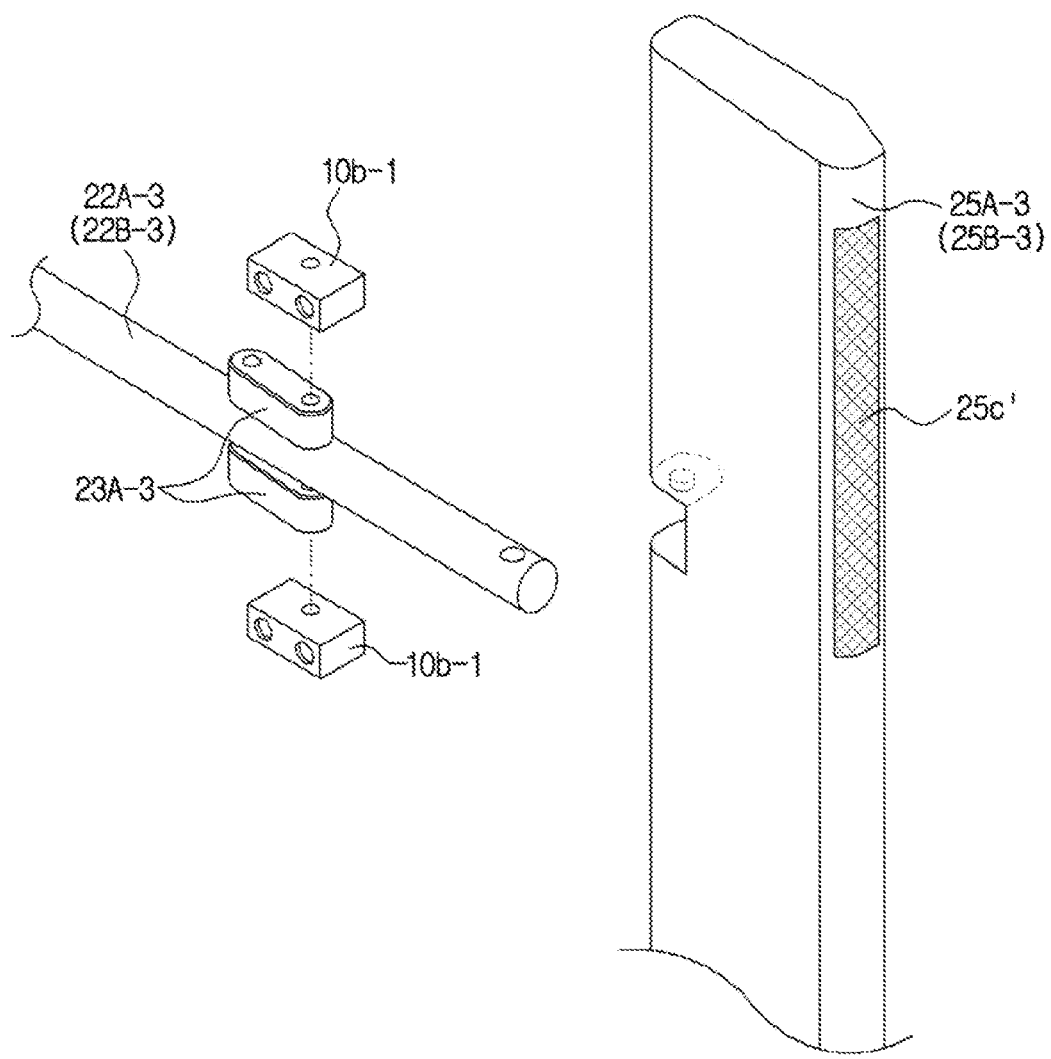
FIG. 35 is an exploded perspective view of movement members, rotation members, and a shield module of the display apparatus according to an exemplary embodiment.
Figure 36:
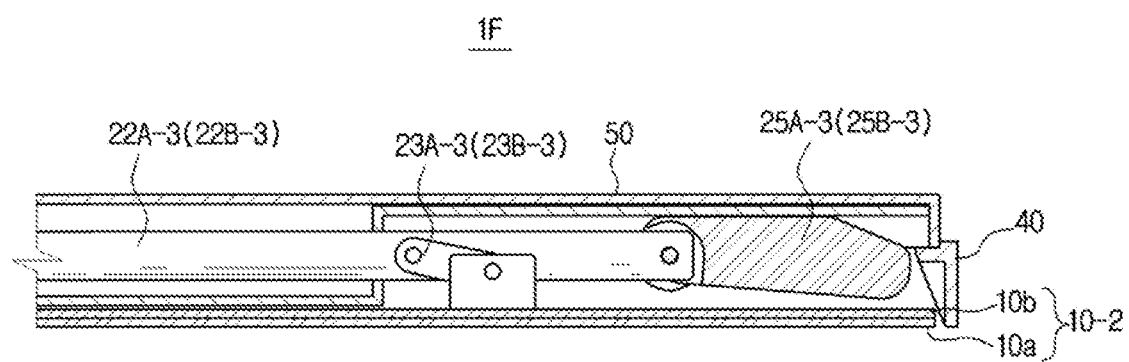
FIG. 36 is a cross-sectional plan view of the movement members, the rotation members, and the shield module of the display module in the flat surface state of the display apparatus according to another exemplary embodiment.
Figure 37:
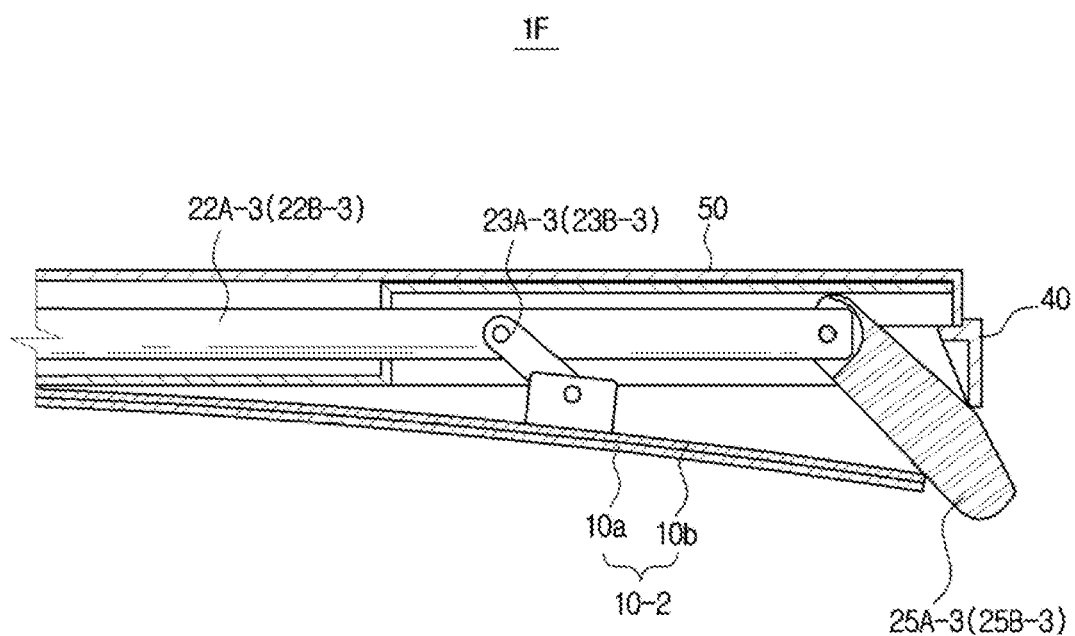
FIG. 37 is a cross-sectional plan view of the movement members, the rotation members, and the shield module of the display module that is deformed to have a curved surface of the display apparatus according to another exemplary embodiment.

FIGS. 35-37 illustrate a display apparatus 1F according to other exemplary embodiments.

As in a display apparatus 1F according to the fifth embodiment shown in FIGS. 35 through 37, the first shield module 25A and the second shield module 25B protrude toward both sides through a space between the display module 10 deformed as a display module 10-2 is deformed and the side case 40.

A first shield module 25A-3 may be rotatably installed at one end of a first movement member 22A-3, and a first rotation member 23A-3 is rotatably installed to be spaced apart from one end of the first movement member 22A-3 by a predetermined distance such that the first shield module 25A-3 and a second shield module 25B-3 may protrude. Also, the second shield module 25B-3 is rotatably installed at one end of a second movement member 22B-3, and a second rotation member 23B-3 is rotatably installed to be spaced apart from one end of the second movement member 22B-3 by a predetermined distance.

For example, when the first shield module 25A-3 and the second shield module 25B-3 and the first rotation member 23A-3 and the second rotation member 23B-3 are rotatably installed at the first movement member 22A-3 and the second movement member 22B-3, the first rotation member 23A-3 and the second rotation member 23B-3 rotate by movement of the first movement member 22A-3 and the second movement member 22B-3 and push both ends of the display module 10 in a forward direction so that the display module 10-2 may be deformed. Accordingly, both sides of the display module 10-2 and the side case 40 may be spaced apart from each other by a predetermined distance.

Also, simultaneously, side ends of the first shield module 25A-3 and the second shield module 25B-3 protrude sideways through both sides of the display module 10-2 and the side case 40 that are spaced apart from each other by the predetermined distance when the first shield module 25A-3 and the second shield module 25B-3 are rotated around ends installed at the first movement member 22A-3 and the second movement member 22B-3.

In this example, speakers 25c' are disposed at ends of the first shield module 25A-3 and the second shield module 25B-3 that protrude through a space between both sides of the display module 10-2 and the side case 40. Accordingly, the first shield module 25A-3 and the second shield module 25B-3 are exposed to the outside as ends of the first shield module 25A-3 and the second shield module 25B-3 protrude from the space between both sides of the display module 10-2 and the side case 40.

When the speakers 25c' are exposed to the outside of the display apparatus 1F in this example, sound generated in the speakers 25c' may be more smoothly transferred to the user.

Also, because the driving device 20 pressurizes only both ends of the display module 10-2 forward, a portion that is deformed with a different curvature from design may occur in the deformed display module 10-2.

Figure 38:
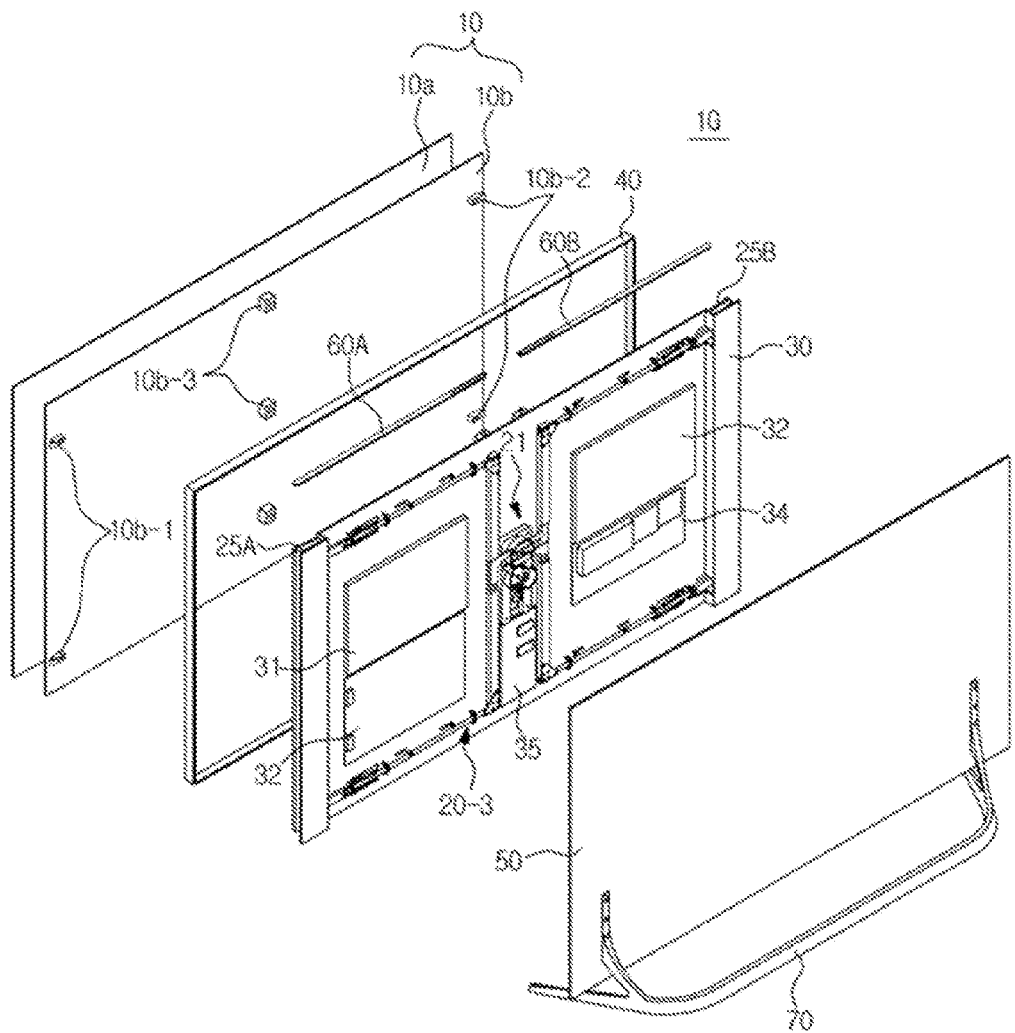
FIG. 38 is an exploded perspective view of a display apparatus according to another exemplary embodiment.
Figure 39:
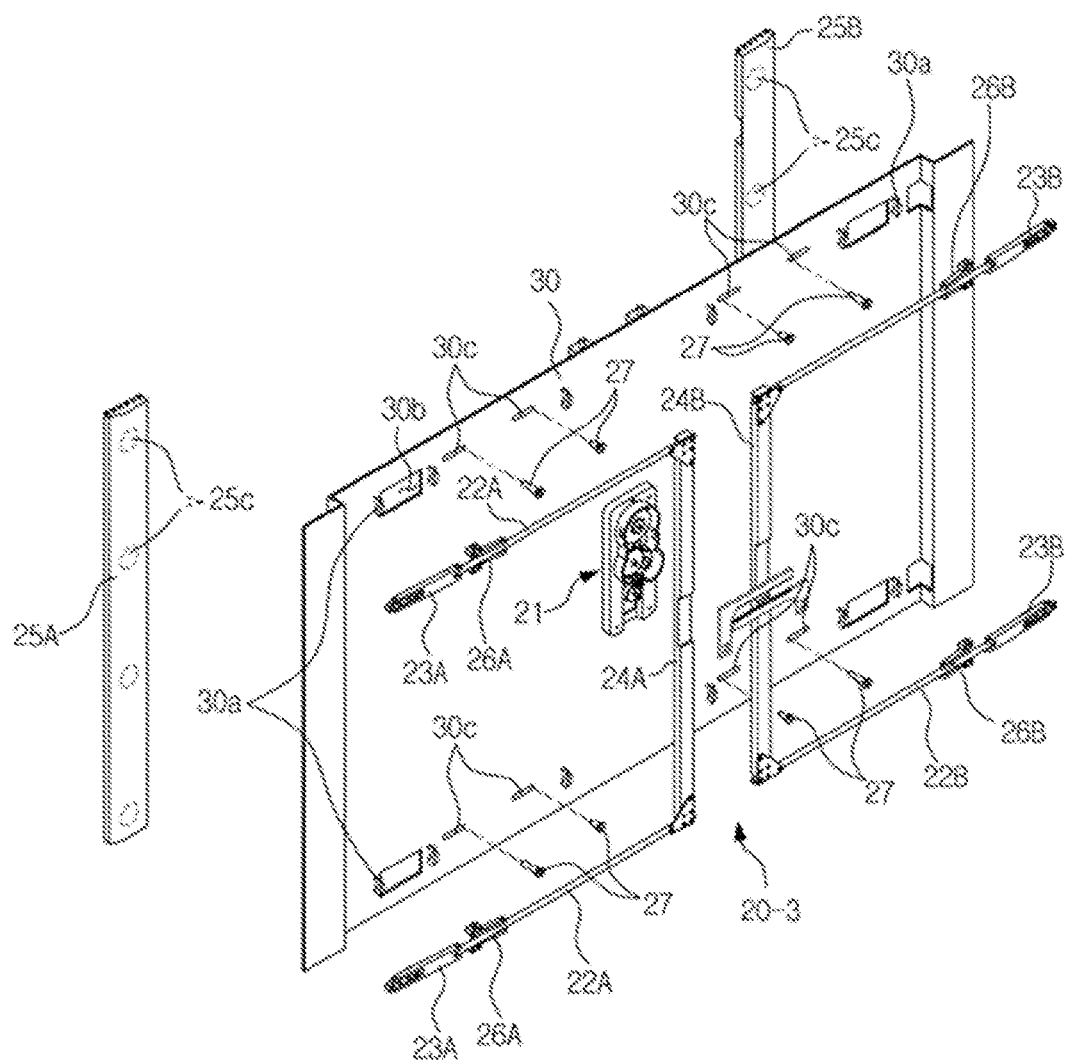
FIG. 39 is an exploded perspective view of a driving device of the display apparatus according to an exemplary embodiment.

FIGS. 38 and 39 illustrate a display apparatus 1G according to another exemplary embodiment. In this example, the display module 10 may be deformed with substantially the same curvature as design.

For example, a driving device 20-3 includes a first movement member 22A, a second movement member 22B, a first rotation member 23A, a second rotation member 23B, a first connection member 24A, a second connection member 24B, and a driving unit 21.

Also, the driving device 20-3 includes a plurality of stoppers 26A, 26B, and 27 that are connected to a rear side of the display module 10 and which restrict deformation of the display module 10 so that deformation of the display module 10 may be precisely performed with a set curvature.

In this example, the plurality of stoppers 26A, 26B, and 27 include a plurality of rotation stoppers 26A and 26B that rotate by rotation of the display module 10 and a plurality of fixing stoppers 27 that are fixed to the rear side of the display module 10.

The plurality of rotation stoppers 26A and 26B are configured so that one end of each of the rotation stoppers 26A and 26B is rotatably installed at the first movement member 22A and the second movement member 22B. Also, the other end of each of the rotation stoppers 26A and 26B is rotatably installed at the rear side of the display module 10 by through holes 30b formed in the base member 30. Thus, the rotation stoppers 26A and 26B rotate by deformation of the display module 10.

The plurality of fixing stoppers 27 are configured so that a front end of each of the fixing stoppers 27 is fixed to the rear side of the display module 10 and a rear end of each of the fixing stoppers 27 passes through hanging holes 30c that are formed in the base member 30 and protrude toward the rear of the base member 30. Hanging portions 27a are disposed at rear ends of the fixing stoppers 27 and are hung in and supported at portions adjacent to the hanging holes 30c of the base member 30 as the display module 10 is deformed to have a curved surface.

Because the above-described fixing stoppers 27 are configured so that their rear ends are moved in a widthwise direction of the display module 10 as the display module 10 is deformed, the hanging holes 30c extend in the widthwise direction of the display module 10 so as to cope with movement of the rear ends of the fixing stoppers 27.

In this example, four rotation stoppers 26A and 26B are disposed so that their ends are rotatably installed at two first movement members 22A and two second movement members 22B, respectively, i.e., at portions that are adjacent to ends at which the above-described first rotation member 23A and second rotation member 23B are installed.

Also, in this example eight fixing stoppers 27 are provided so that respective four fixing stoppers 27 are installed at upper and lower portions of the rear side of the display module 10 so as to be spaced from each other in the widthwise direction of the display module 10.

The lengths of four fixing stoppers 27 installed in the center of the display module 10 are smaller than those of the remaining four fixing stoppers 27. This is to cope with a situation in which both ends of the display module 10 move more in the forward/backward direction rather than in the center of the display module 10 as the display module 10 is deformed.

Figure 40:
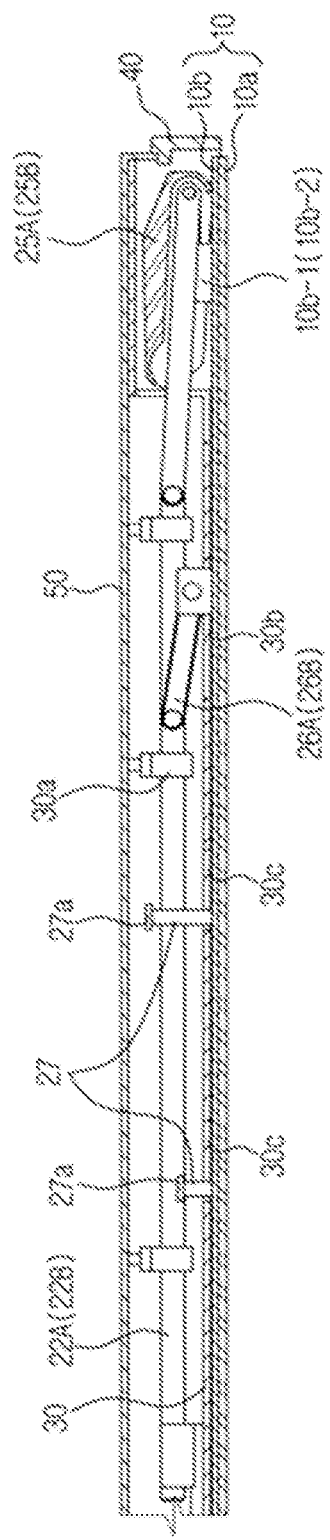
FIGS. 40 and 41 are cross-sectional plan views of an operation of the display apparatus according to exemplary embodiments.

FIG. 40 illustrates the display module 10 in a flat surface state. In this state, the rotation stoppers 26A and 26B are maintained adjacent to the movement members 22A and 22B. In addition, the fixing stoppers 27 are maintained so that the hanging portions 27a of the fixing stoppers 27 protrude from the base member 30 backward and are maintained to be spaced apart from each other.

Figure 41:
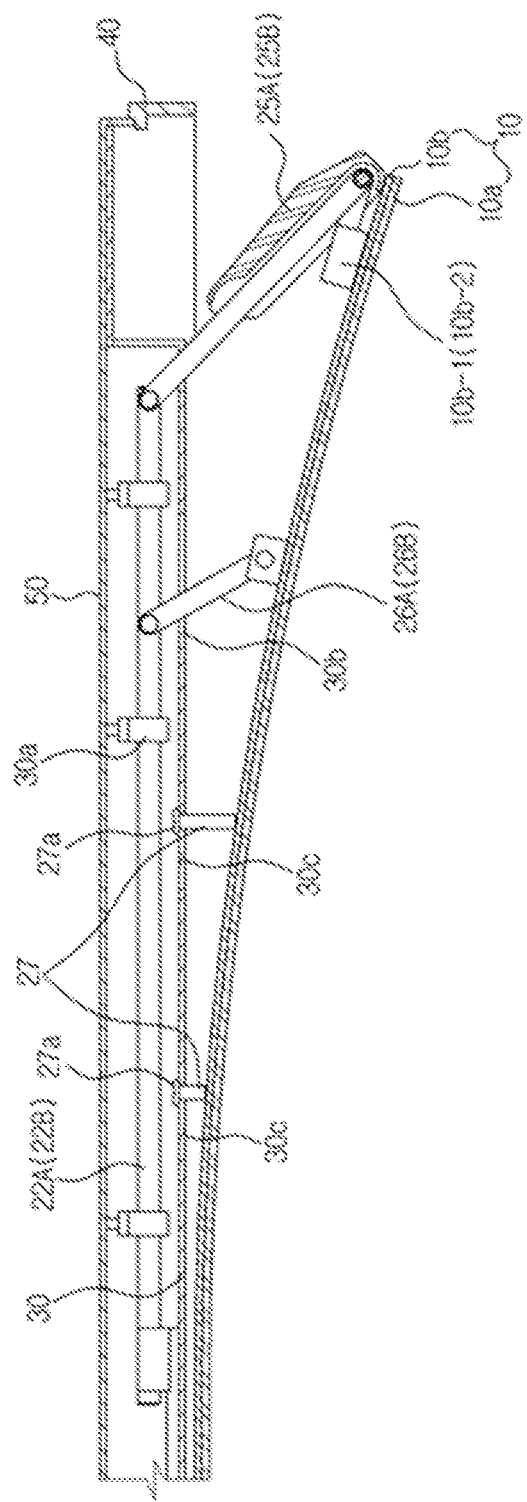

As the display module 10 is deformed to have a curved surface, the rotation stoppers 26A and 26B rotate, and the fixing stoppers 27 are moved forward and are hung in portions adjacent to the hanging holes 30c of the base member 30, as illustrated in the example of FIG. 41. Thus, deformation of portions of the display module 10 in which the rotation stoppers 26A and 26B and the fixing stoppers 27 are installed, is limited by the rotation stoppers 26A and 26B and the fixing stoppers 27.

Thus, lengths of the rotation stoppers 26A and 26B and lengths of the fixing stoppers 27 are adjusted according to design so that a curvature of each portion of the deformed display module 10 may be precisely adjusted.

In this example, the rotation stoppers 26A and 26B and the fixing stoppers 27 are used together. However, one or more exemplary embodiments are not limited thereto, and only one of the rotation stoppers 26A and 26B and the fixing stoppers 27 may be used.

Figure 42:
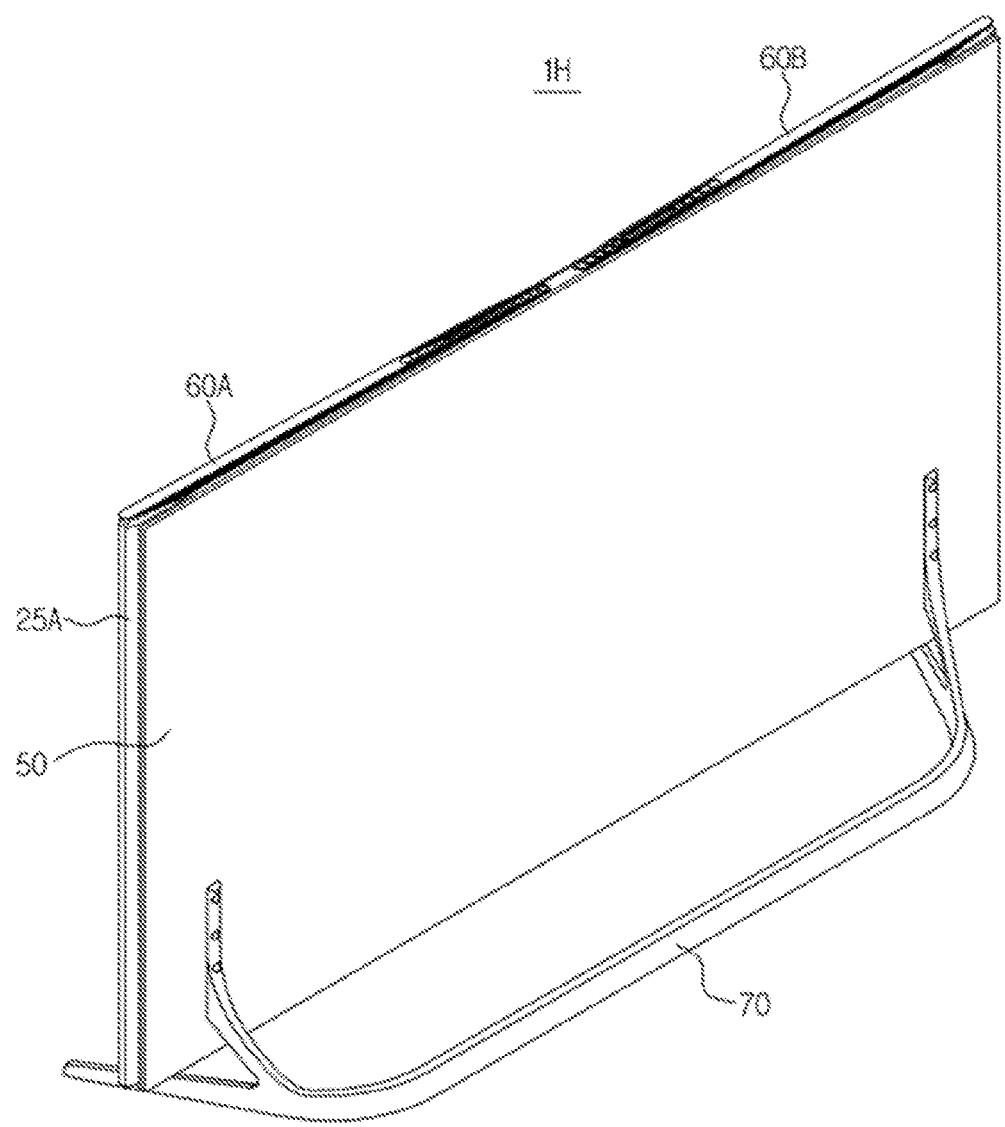
FIGS. 42 and 43 are perspective views of an operation of a display apparatus according to exemplary embodiments.
Figure 43:
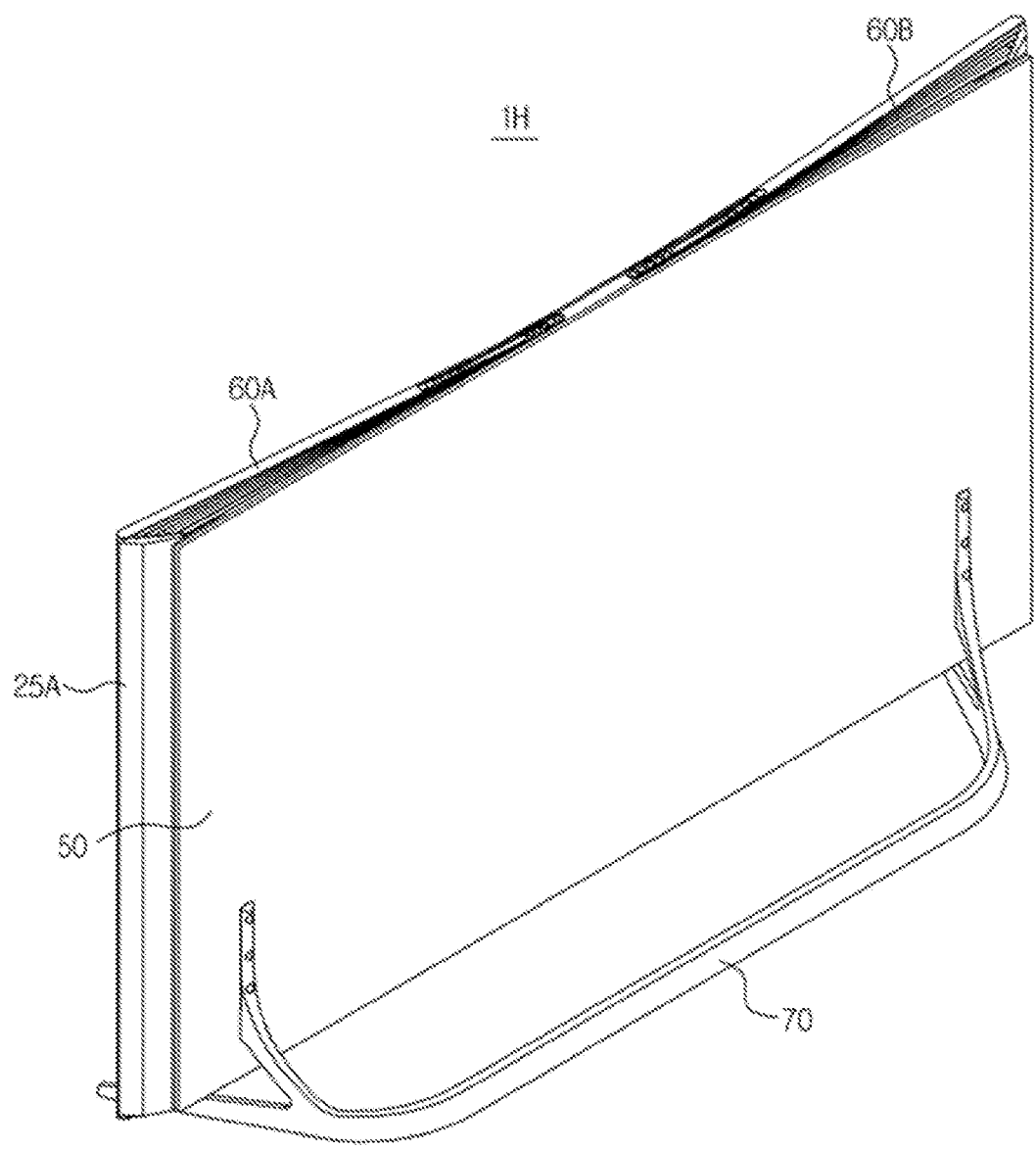

Also, side ends of the display module 10 are covered in the side case 40. However, one or more exemplary embodiments are not limited thereto. As illustrated in FIGS. 42 and 43, even when no side case is present, sides of the display module 10 are covered by the cover members 60A and 60B and the shield modules 25A and 25B so that the side case may be omitted according to design.

Figure 44:
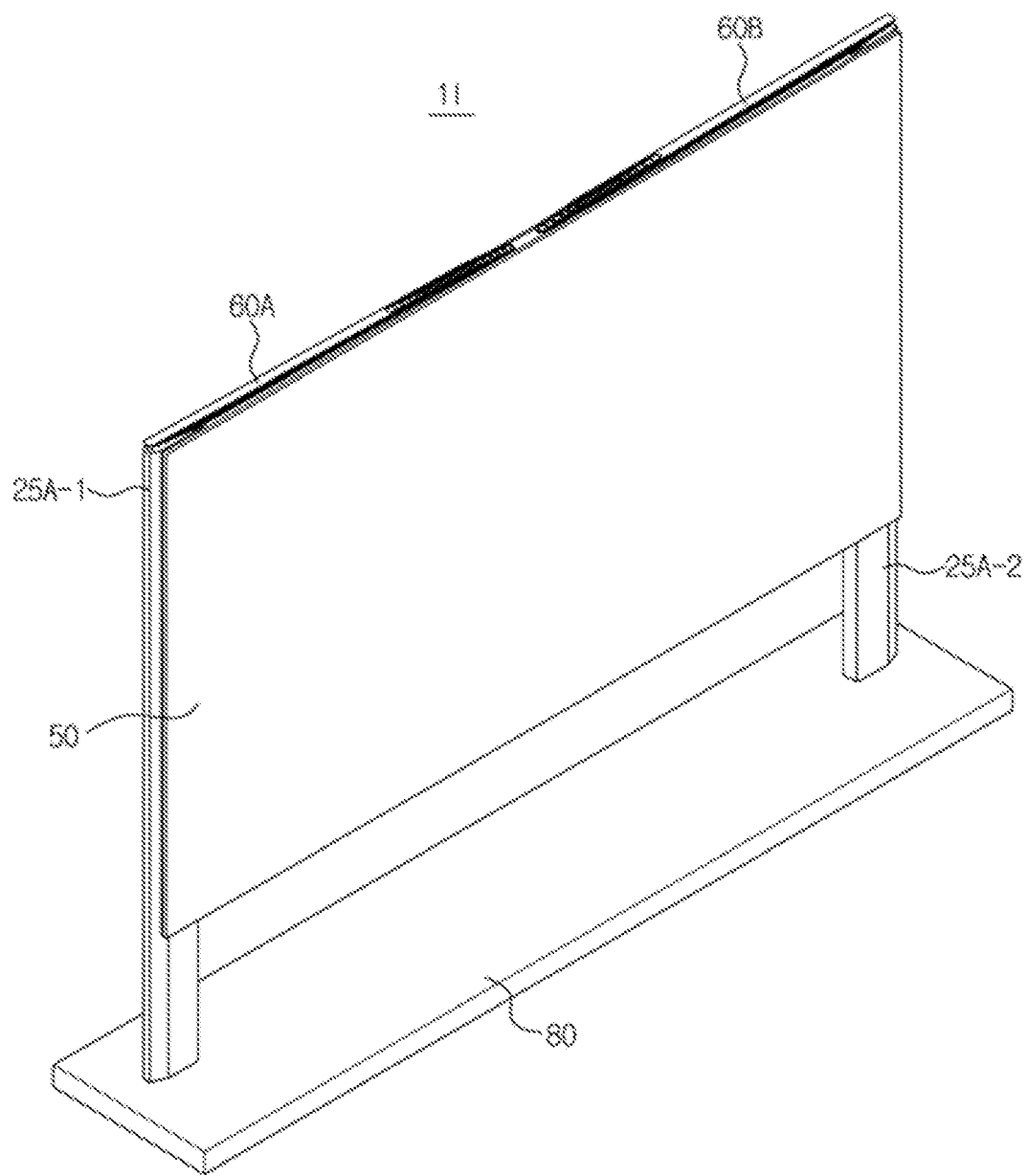
FIGS. 44 and 45 are perspective views of an operation of a display apparatus according to exemplary embodiments.
Figure 45:
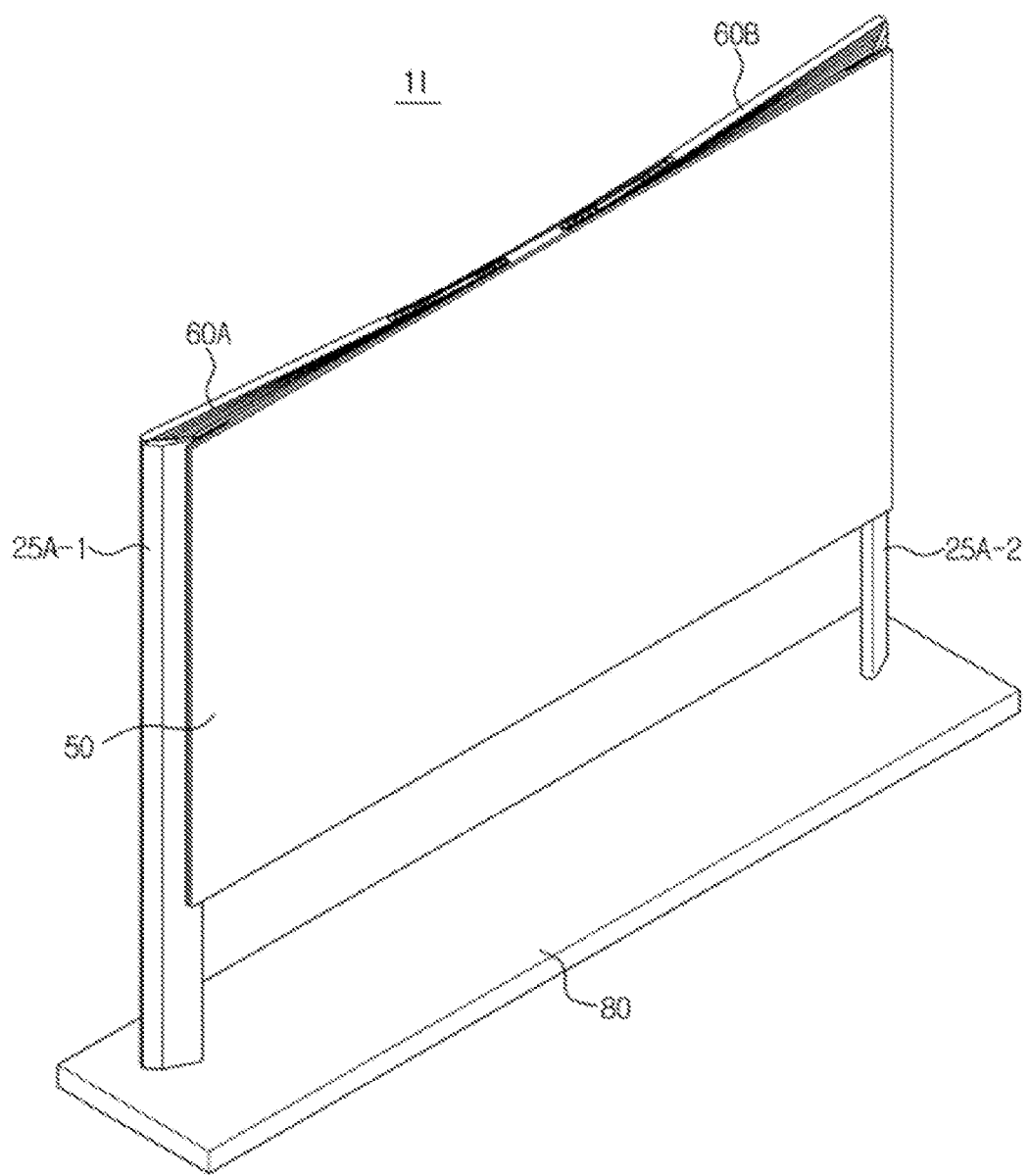

Also, in the present embodiment, a display apparatus 1H of FIG. 43 includes a stand 70. However, one or more exemplary embodiments are not limited thereto. As illustrated in FIGS. 44 and 45, a display apparatus 1I includes a base plate 80 that is put on a horizontal plane, such as on an indoor floor or a shelf and is supported thereon. Bottom ends of a first shield module 25A-1 and a second shield module 25A-2 protrude downward and are rotatably installed at the base plate 80. Thus, the first shield module 25A-1 and the second shield module 25A-2 may serve as a part of a stand.

Alternatively, holes having specifications of the Video Electronics Standard Association (VESA) are formed in a rear case 50 without a configuration corresponding to the stand 70 so that the display apparatus 1I may be installed in a wall-mounted shape along a wall using a wall-mounted bracket that is fixed to the wall.

Figure 46:
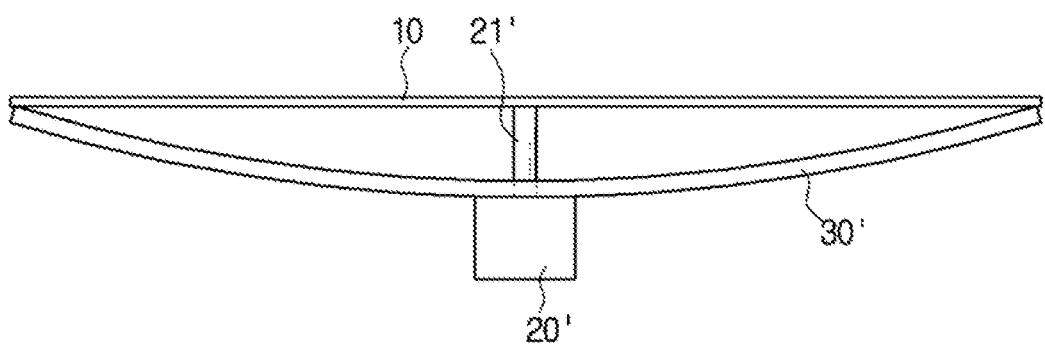
FIGS. 46 and 47 are schematic views of an operation of a display apparatus according to exemplary embodiments.
Figure 47:
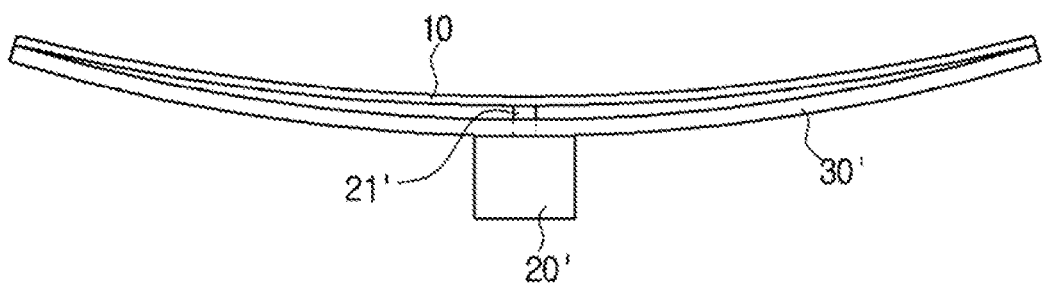

Also, in the above-described exemplary embodiments, the base member 30 may have an approximately flat surface shape. However, one or more exemplary embodiments are not limited thereto. As illustrated in FIGS. 46 and 47, a base member 30' may be formed in a curved surface shape so that the display module 10 may be deformed in the curved surface shape using the base member 30'.

In this example, a driving device 20' includes a driving unit 21' that is connected to a central part of the display module 10 and moves the central portion of the display module 10 forward/backward.

When the base member 30' and the driving device 20' are configured in this way, if the display module 10 is maintained in the flat surface state and the central part of the display module 10 is moved backward by the driving device 20', the rear side of the display module 10 is supported on the base member 30' and the display module 10 is deformed to have a curved surface to correspond to the base member 30'. Also, when the display module 10 is in the curved surface state and the central part of the display module 10 is moved forward by the driving device 20', the display module 10 may be dispersed and returned to the flat surface state.

Also, in the above-described exemplary embodiments, the driving device 20 is installed at a rear side of the base member 30, and the rear of the base member 30 in which the driving device 20 is installed, is covered by the rear case 50. However, one or more exemplary embodiments are not limited thereto.

Figure 48:
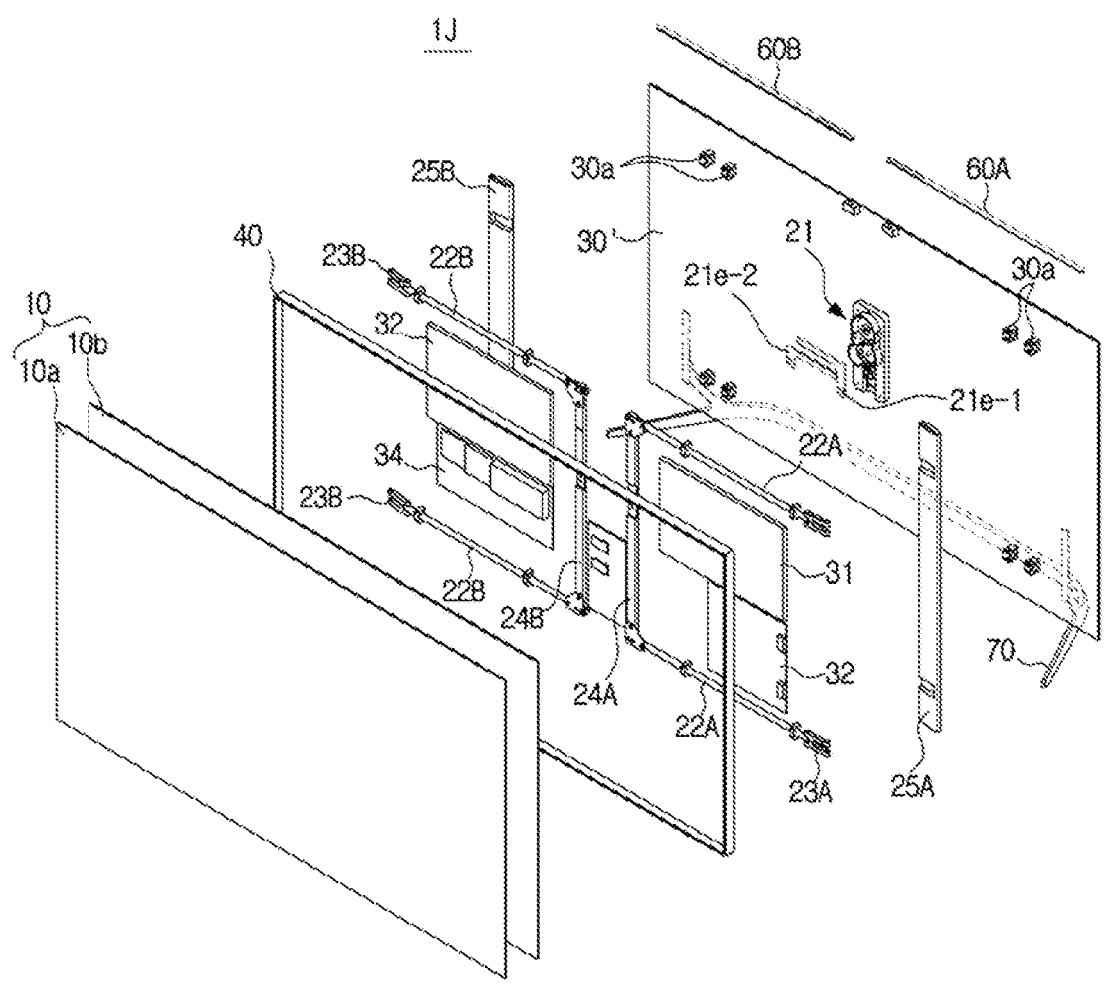
FIG. 48 is an exploded perspective view of a display apparatus according to another exemplary embodiment.

FIG. 48 illustrates a display apparatus 1J according to another exemplary embodiment. In this example, a display device 20 may be fixed to a base member 30' in a state in which the driving device 20 is disposed between a display module 10 and the base member 30', and a stand 70 may be fixed to a rear side of the base member 30' so that the base member 30' may serve as a case. In this example, the display module 10 is connected to the driving device 20, a driving unit 21 of the driving device 20 is fixed to a front side of the base member 30', and the base member 30' is fixed to the stand 70. Thus, the display module 10 is supported on the stand 70 using the driving device 20 and the base member 30'.

In this case, PCBs 31, 32, 33, and 35 may be fixed to a front side of the base member 30'. Alternatively, the PCBs 31, 32, 33, and 35 may be installed at a rear side of the display module 10, or may be installed in a control module in which the PCBs 31, 32, 33, and 35 are accommodated and may be mounted on the rear side of the base member 30' or the stand 70 using the control module.

When PCBs are installed at the rear side of the display module, as represented in the above example, in order to cope with deformation of the display module, the PCBs may be configured so that only one end of each of the PCBs is fixed to the rear side of the display module and the other end of each of the PCBs is movably installed at the rear side of the display module or may be a free end.

Also, in the present example, the size of the base member 30' is sufficiently large so that the base member 30' serves as a case. However, one or more exemplary embodiments are not limited thereto. After the size of the base member is made small enough within a range in which the driving unit may be fixedly installed, an additional case (not shown) may be coupled to the rear of the display module 10 and the base member may be covered by the case. For example, the case may be deformable to be deformed according to deformation of the display module.

In the above-described exemplary embodiments, the base member 30 is widely formed in a rectangular plate shape so as to perform a function of supporting the driving unit 21 and the PCBs 31, 32, 33, and 35 of guiding movement of movement members 22A and 22B. However, one or more exemplary embodiments are not limited thereto. For example, the shape of the base member may be changed in various ways while the base member performs the function of supporting the driving unit. That is, the base member may have a plate shape that is long in the vertical direction or a bar shape having a predetermined thickness so that only a driving unit of the driving device may be installed at the base member or a housing of the driving unit that supports elements of the driving unit may be used as the base member.

According to one or more exemplary embodiments, as described herein a display module of a display apparatus may be deformed according to a user's selection so that the display module may be selectively used in one of a flat surface state and a curved surface state.

In addition, as described above, in the display apparatus according to one of the one or more exemplary embodiments, the display module may be selectively used in one of the flat surface state and the curved surface state based on a type of content of an image.

The methods described above can be written as a computer program, a piece of code, an instruction, or some combination thereof, for independently or collectively instructing or configuring a processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

Although a few embodiments have been shown and described, it would be appreciated by those skilled in the art that changes may be made in these embodiments without departing from the principles and spirit of the inventive concept, the scope of which is defined in the claims and their equivalents.

What is claimed is:
1. A display apparatus comprising:
    a display module;
    a driving device that is configured to deform the display module from a flat surface state to a curved surface state and deform the display module from the curved surface state to the flat surface state; and
    a base member that is disposed at a rear of the display module and supports the driving device,
    wherein the driving device comprises:
    a driving unit installed at the base member and configured to generate a driving force;
    a plurality of movement members configured to move linearly in opposite directions from one another based on a driving force generated by the driving unit; and
    a plurality of rotation members configured to rotate in response to the linear movement of the plurality of movement members and configured to cause respective sides of the display module to be moved.

2. The display apparatus of claim 1, further comprising a case that covers a rear side of the base member.

3. The display apparatus of claim 2, wherein the case is deformed to correspond to a deformation of the display module.

4. The display apparatus of claim 1, wherein the plurality of movement members comprise:
at least one first movement member that is configured to move linearly in a first direction; and
at least one second movement member that is configured to move linearly in a second direction opposite to the first direction, and
wherein the plurality of rotation members comprise:
at least one first rotation member having a first end that is rotatably installed at the at least one first movement member and a second end that is rotatably installed at a first side end of the display module; and
at least one second rotation member having a first end that is rotatably installed at the at least one second movement member and a second end that is rotatably installed at a second side end of the display module placed at an opposite side to the first side end.

5. The display apparatus of claim 4, wherein the base member comprises a plurality of movement guides that support the at least one first movement member and the at least one second movement member to be movable.

6. The display apparatus of claim 4, wherein the driving unit comprises:
a driving motor that is configured to generate a rotational force;
a pinion that is configured to rotate by the rotational force transmitted from the driving motor; and
a first rack and a second rack that horizontally move in opposite directions according to rotation of the pinion,
wherein the at least one first movement member is configured to move in the first direction toward the first side end of the display module using the first rack, and
wherein the at least one second movement member is configured to move in the second direction using the second rack.

7. The display apparatus of claim 6, wherein the at least one first movement member comprises a pair of first movement members that are disposed to be spaced apart from each other in a vertical direction,
wherein the at least one second movement member comprises a pair of second movement members that are disposed to be spaced apart from each other in the vertical direction, and
wherein the driving device further comprises:
a first connection member configured to extend in a vertical direction, connect the pair of first movement members and be connected to the first rack; and
a second connection member configured to extend in a vertical direction, connect the pair of second movement members and be connected to the second rack.

8. The display apparatus of claim 7, wherein the at least one first rotation member comprises a pair of first rotation members having a first end that is rotatably installed at the pair of first movement members and a second end is rotatably installed at the first side end of the display module, and
wherein the at least one second rotation member comprises a pair of second rotation members having a first end that is rotatably installed at the pair of second movement members and a second end that is rotatably installed at the second side end of the display module.

9. The display apparatus of claim 1, further comprising at least one printed circuit board (PCB) disposed between the display module and the base member.

10. The display apparatus of claim 9, wherein the at least one PCB comprises:
at least one of a power substrate that is configured to connect to an external power supply and supply power to the display apparatus;
a signal processing substrate configured to process various image and sound signals;
a panel driving substrate that is configured to control driving of a display module included in the display module; and
a timing control substrate that is configured to transmit the image signals to the display panel.

11. The display apparatus of claim 1, further comprising a stand fixed to the base member.

12. The display apparatus of claim 1, wherein the linear movements of the plurality of movement members cause the plurality of rotation members to simultaneously rotate with the linear movements of the plurality of movement members.

13. A display apparatus comprising:
a display module;
a driving device that is configured deform the display module from a flat surface state to a curved surface state and deform the display module from the flat surface state to the curved surface state, the driving device comprising:
a driving unit installed at the base member and configured to generate a driving force;
a first movement member;
a second movement member, the first and second movement members configured to move linearly in opposite directions from each other based on a driving force generated by the driving unit;
a first rotation member; and
a second rotation member, the first and second rotation members configured to rotate when the first and second movement members move linearly and configured to cause respective sides of the display module to be moved; and
a controller that is configured to control the driving device,
wherein the controller is configured to operate the driving device according to a user input.

14. The display apparatus of claim 13, wherein the user input is received through a button disposed on one of a remote controller and the display apparatus.

15. The display apparatus of claim 14, wherein the driving device is configured to deform a curvature of the display module in a continuous manner in proportion to a pressing time of the button on one of the remote controller and the display apparatus.

16. The display apparatus of claim 14, wherein the driving device is configured to deform a curvature of the display module in a multi-stage manner according to a number of times the button on one of the remote controller and the display apparatus is pressed.

17. The display apparatus of claim 13, wherein the linear movements of the first and second movement members cause the first and second rotation members to simultaneously rotate with the linear movements of the plurality of movement members.

18. A display apparatus comprising:
a display module;

a driving device that is configured to deform the display module from a flat surface state to a curved surface state and deform the display module from the flat surface state to the curved surface state, the driving device comprising:
  a driving unit installed at the base member and configured to generate a driving force;
  a first movement member;
  a second movement member, the first and second movement members configured to move linearly in opposite directions from each other based on a driving force generated by the driving unit;
  a first rotation member; and
  a second rotation member, the first and second rotation members configured to rotate when the first and second movement members move linearly and configured to cause respective sides of the display module to be moved; and
a controller that is configured to control the driving device,
wherein the controller is configured to operate the driving device based on a type of content of an image to be displayed on the display module.

19. The display apparatus of claim 18, wherein the controller is configured to operate the driving device based on input information regarding the type of content.

20. The display apparatus of claim 19, wherein the input information regarding the type of content is input using a button disposed on one of a remote controller and the display apparatus.

21. The display apparatus of claim 18, wherein the input information regarding the type of content is received from an image transmitter that transmits the image, together with image information.

22. The display apparatus of claim 18, wherein the linear movements of the first and second movement members cause the first and second rotation members to simultaneously rotate with the linear movements of the first and second movement members.

23. An apparatus for adjusting a curvature of a display panel, the apparatus comprising:
  a driving device that is configured to adjusting the curvature of the display panel between a flat state and a curved state, the driving device comprising:
    a driving unit installed at the base member and configured to generate a driving force;
    a first movement member;
    a second movement member, the first and second movement members configured to move linearly in opposite directions from each other based on a driving force generated by the driving unit;
    a first rotation member; and
    a second rotation member, the first and second rotation members configured to rotate when the first and second movement members move linearly and configured to cause respective sides of the display panel to be moved;
  an interface configured to receive an input from a user or to detect contents being played or selected to be played on a display of the display panel; and
  a controller configured to adjust the curvature of the display panel, in response to the interface receiving the input or detecting the contents.

24. The apparatus of claim 23, wherein, in response to the interface receiving the input from the user, the controller adjusts the curvature of the display panel in response to the received input from the user.

25. The apparatus of claim 23, wherein, in response to the interface detecting the contents being played or selected to be played on the display, the controller adjusts the curvature of the display panel.

26. The apparatus of claim 23, wherein the controller is configured to adjust the curvature of the frame equally by adjusting opposing end portions of the display panel by an amount between a minimum and maximum adjustment range of the curvature.

27. The apparatus of claim 23, wherein the controller is further configured to change a sound setting of the display apparatus to correspond to the adjusting of the curvature of the display panel.

28. The apparatus of claim 23, wherein the linear movements of the first and second movement members cause the first and second rotation members to simultaneously rotate with the linear movements of the first and second movement members.

* * * * *